(12) United States Patent
Graeve et al.

(10) Patent No.: US 8,557,208 B2
(45) Date of Patent: Oct. 15, 2013

(54) COMBUSTION SYNTHESIS METHOD AND BORON-CONTAINING MATERIALS PRODUCED THEREFROM

(75) Inventors: Olivia A. Graeve, Alfred, NY (US); Raghunath Kanakala, Alfred, NY (US); Gabriel Rojas-George, Chihuahua (MX)

(73) Assignee: Board of Regents of the Nevada System of Higher Education, on behalf of the University of Nevada, Reno, Reno, NV (US)

( * ) Notice: Subject to any disclaimer, the term of this patent is extended or adjusted under 35 U.S.C. 154(b) by 359 days.

(21) Appl. No.: 12/472,050

(22) Filed: May 26, 2009

(65) Prior Publication Data

US 2012/0177556 A1    Jul. 12, 2012

Related U.S. Application Data

(60) Provisional application No. 61/055,807, filed on May 23, 2008, provisional application No. 61/055,821, filed on May 23, 2008.

(51) Int. Cl.
*C01B 35/00* (2006.01)
*C01B 35/02* (2006.01)
*C01B 35/04* (2006.01)

(52) U.S. Cl.
USPC ............ 423/276; 423/289; 423/263; 423/297

(58) Field of Classification Search
None
See application file for complete search history.

(56) References Cited

U.S. PATENT DOCUMENTS

| 4,260,525 | A | * | 4/1981 | Olsen et al. ................. 252/521.1 |
| 5,376,421 | A | * | 12/1994 | Sekhar et al. ................. 427/224 |
| 5,611,828 | A | * | 3/1997 | Celikkaya ........................ 51/309 |
| 5,647,988 | A | * | 7/1997 | Kawanishi et al. ........... 210/636 |
| 2005/0029495 | A1 | * | 2/2005 | Hubacek et al. ........ 252/301.4 R |
| 2005/0080175 | A1 | * | 4/2005 | Paik et al. ...................... 524/418 |
| 2008/0268246 | A1 | * | 10/2008 | Stark et al. .................... 428/402 |
| 2009/0095604 | A1 | * | 4/2009 | Johnson et al. ............. 200/61.03 |

FOREIGN PATENT DOCUMENTS

| JP | 2005-1918 | * | 1/2005 |
| JP | 2005 001918 | * | 1/2005 |
| KR | 2003071014 | * | 7/2003 |
| KR | 2003071014 | * | 9/2003 |
| RU | 2054377 | * | 4/1996 |
| WO | WO 90 14307 | * | 10/1990 |
| WO | WO 90 14307 | * | 11/1990 |

* cited by examiner

*Primary Examiner* — Curtis Mayes
*Assistant Examiner* — Bijay Saha
(74) *Attorney, Agent, or Firm* — Wood, Herron & Evans, LLP

(57) ABSTRACT

One embodiment of the present disclosure provides a method of making a ceramic material that contains boron and a metal. A metal source, an oxidizer, a boron source, and a fuel source are combined. These reactants are then heated at, or to, a temperature sufficient to initiate a combustion reaction. The combustion reaction produces a ceramic material that includes boron and the metal. The present disclosure also provides materials formed by the disclosed method, as well as methods and systems using such materials.

19 Claims, 13 Drawing Sheets

COMBUSTION SYNTHESIS METHOD AND BORON-CONTAINING MATERIALS PRODUCED THEREFROM

CROSS REFERENCE TO RELATED APPLICATIONS

This application claims the benefit of, and incorporates by reference, U.S. Provisional Patent Application No. 61/055,807, filed May 23, 2008, and U.S. Provisional Patent Application No. 61/055,821, filed May 23, 2008.

STATEMENT OF GOVERNMENT SUPPORT

This invention was made with United States Government support under grants from the Department of Defense, Department of the Army, Grant Nos. W911NF-06-1-0226 and W911NF-08-1-0330. The United States Government has certain rights in the invention.

FIELD

The present disclosure generally relates to a combustion synthesis method and material produced thereby. In a specific example, the present disclosure provides a method of producing compounds that include boron and a metal, such as a rare earth metal.

SUMMARY

The present disclosure provides, among other things, a method of making a ceramic material that contains boron and a metal. According to one embodiment, a metal source, an oxidizer, a boron source, and a fuel source are combined. These reactants are then heated at, or to, a temperature sufficient to initiate a combustion reaction. The combustion reaction produces a ceramic material that includes boron and the metal. In some examples, the ceramic material includes a borate material. In further examples, the ceramic material includes a boride material, such as a hexaboride or dodecaboride. In yet further examples, the ceramic material includes both boride and borate materials.

In particular implementations, the fuel source is a carbonaceous fuel source, such as an organic compound. In various examples, the fuel source is selected from carbohydrazide, glycine, urea, citric acid, and mixtures thereof. In a specific example, the fuel source is carbohydrazide.

The metal, in various aspects, is a rare earth metal, an alkaline earth metal, zirconium, or thorium. In some examples, the rare earth metal is lanthanum, cerium, ytterbium, yttrium, samarium, praseodymium, neodymium, gadolinium, or dysprosium. In a specific example, the rare earth metal is lanthanum. In another specific example, the rare earth metal is samarium. In yet another specific example, the rare earth metal is yttrium. In other aspects, the alkaline earth metal is calcium, strontium, or barium.

In one implementation, the combined reactants are heated at a temperature sufficient to initiate a combustion reaction, such as between about 350° C. and about 700° C., such as about 500° C. In another implementation, the mixed reactants are heated from a temperature lower than the combustion reaction initiation temperature to the combustion reaction initiation temperature. In some cases, heating the reactants from a lower temperature can favor one combustion product over another, such as favoring a boride material over a borate material. For example, heating from a lower temperature can allow complex formation between the oxidizer and fuel.

The oxidizer, in some examples, is part of the metal source. For example, nitrate may be used as the oxidizer, in which case it can be supplied by a nitrate salt of the metal. In other examples, a separate oxidizer is added, which may be in addition to or in place of an oxidizer present in the metal source. In specific examples, the separate oxidizer is a nitrate salt, such as ammonium nitrate, or a perchlorate salt, such as sodium perchlorate.

In one embodiment, the ceramic material formed from the combustion reaction is washed, such as to remove impurities, separate a component of interest, or alter the physical properties of the material, such as its degree of agglomeration or morphology. In a specific implementation, the ceramic material is washed with an acid, such as a mineral acid. In one example, the acid is sulfuric acid. In another example, the acid is hydrochloric acid. In yet another example, the ceramic is first washed with hydrochloric acid and then with sulfuric acid.

The present disclosure also provides ceramic materials formed by the above method. In some cases, the ceramic materials have relatively small particle sizes or a relatively narrow distribution of particle sizes.

The present disclosure also relates to methods of using the ceramic materials, or devices incorporating the ceramic materials. In a particular example, the present disclosure relates to a hydrogen storage device formed from a disclosed boride material, such as a boride compound of lanthanum, such as lanthanum hexaboride, or samarium. Hydrogen is selectively adsorbed or released from the ceramic material using an electric field.

There are additional features and advantages of the various embodiments of the present disclosure. They will become evident from the following disclosure.

In this regard, it is to be understood that this is a brief summary of the various embodiments described herein. Any given embodiment of the present disclosure need not provide all features noted above.

DETAILED DESCRIPTION

Figure 1:
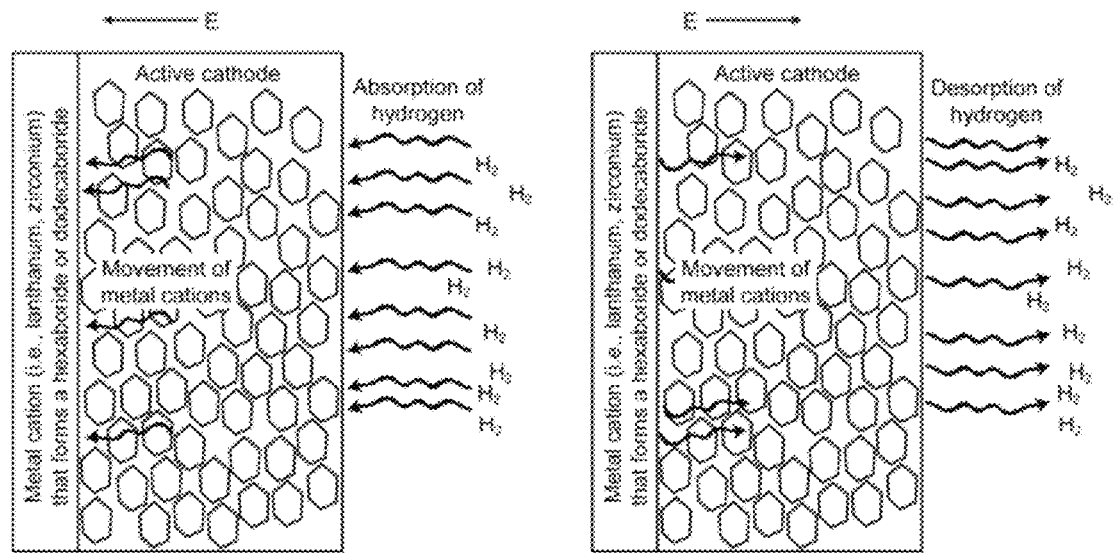
FIG. 1 is a schematic diagram illustrating how a material prepared according to the present disclosure can be used for hydrogen storage.

Unless otherwise explained, all technical and scientific terms used herein have the same meaning as commonly understood by one of ordinary skill in the art to which this disclosure belongs. In case of conflict, the present specification, including explanations of terms, will control. The singular terms "a," "an," and "the" include plural referents unless context clearly indicates otherwise. Similarly, the word "or" is intended to include "and" unless the context clearly indicates otherwise. The term "comprising" means "including;" hence, "comprising A or B" means including A or B, as well as A and B together. All numerical ranges given herein include all values, including end points (unless specifically excluded) and any and all intermediate ranges between the endpoints.

Although methods and materials similar or equivalent to those described herein can be used in the practice or testing of the present disclosure, suitable methods and materials are described herein. The disclosed materials, methods, and examples are illustrative only and not intended to be limiting.

In order to facilitate an understanding of the embodiments presented, the following explanations are provided.

"Combustion synthesis" refers to a type of self-propagating high-temperature synthesis reaction (SHS). Combustion synthesis typically uses a self-sustaining highly exothermic reaction. The reactions are non-catalytic and liberate enough heat to self-propagate after ignition. This propagation typically produces a self-sustaining wave that travels through the entire reactant materials. Any suitable method can be used to initiate the reaction, including linear heating, laser irradiation, convection heating, microwave irradiation, and others.

The reaction produces gaseous products and can be designed such that the products contain the desired voluminous material and gases that escape during the reaction. For example, proper selection of reaction conditions can allow gaseous products to carry heat away from the system, hinder particle growth, and allow the synthesis of powders with crystallites, such as crystallites of nanometer dimensions. The gases produced by the reaction can increase the surface area of the products, such as by creating micro- and nano-porous regions within the reaction zone. Due to the high temperatures typically reached during the process, volatile impurities are often eliminated during reaction, which can produce high-purity materials. Near-net shape components can be prepared through SHS by using the exothermic heat from the reaction for processes such as casting, consolidation, and coating.

Two factors that can be important for the SHS method, and for the properties of the resulting products, are porosity and bond strength between the reactant grains. The final porosity of the products can be affected by the initial packing density of the reactant powders. Gases formed during reaction can also affect the final product density. Volatilization of impurities can also affect final porosity. The degree to which impurity volatilization affects final porosity typically depends on the nature of the impurity.

According to the present disclosure, the combustion reaction takes place between a metal source, a boron source, a fuel, and an oxidizer. In some aspects, the metal source and the oxidizer are provided by the same compound. For example, a metal nitrate may be used to supply both the metal and the oxidizer, in the form of nitrate. In other aspects, the oxidizer is a separate material, although it may be provided in addition to oxidizer from the metal source. In specific examples, the separate oxidizer is a nitrate salt or a perchlorate salt, such as ammonium nitrate or sodium perchlorate.

The fuels are generally organic compounds with hydrocarbon chains attached to reactive groups, such as amino, hydroxyl, or carboxyl groups.

A high temperature interaction is provided by the decomposition of the oxidizer, such as a nitrate species, when it reacts with the fuel. The reactants are typically provided in stoichiometric proportions. The reactants are typically mixed prior to reaction, when the reactants are dry. A solvent may be used when desired, or advisable, such as with a liquid fuel. The use of a solvent with a liquid fuel can aid in dispersing the fuel with the oxidizer and metal source. Suitable solvents typically include water and lower alkyl alcohols, such as methanol, ethanol, isopropanol, and mixtures thereof.

In specific examples, the reactants are heated to a moderate temperature, igniting the reactants and leading to the formation of products. Combustion synthesis is, in particular configurations, initiated on a heating plate or in an autoclave or a muffle furnace. In more specific implementations, the reactants are heated at temperatures of about 500° C. or less. In other embodiments, the reactants are heated from a lower temperature to a temperature where the combustion synthesis reaction initiates. The temperature at which the combustion reaction initiates can be empirically determined, such as by watching for signs of the exothermic reaction as the reactants are heated. The heating regime can, in some cases, affect which products are produced by the reaction.

The temperature of the reaction can be affected by a number of factors, including the type of fuel, the fuel-to-oxidizer ratio, and the amount of solvent left at the time of ignition. In many cases, one or more of these variables can be adjusted to produce a desired reaction temperature. Different reaction temperatures can, in some cases, favor a particular product or product distribution. For example, higher temperatures can favor borate materials over boride compounds.

"Fuel" refers to a carbonaceous fuel, such as an organic fuel, suitable for use in combustion synthesis. Fuels are typically selected so that they react non-violently, produce non-toxic gases, and act as complexing agents for metal cations. Suitable fuels include carbohydrazide, glycine, urea, citric acid, and mixtures thereof. In addition to affecting the reaction temperature, different fuels can initiate reactions at different temperatures. For example, carbohydrazide can decompose and initiate reactions at lower temperatures than glycine, under some conditions. As different reaction temperatures and initiation temperatures can produce different products or product distributions, the fuel is typically selected to maximize a particular desired product or to provide desired manufacturing conditions.

"Fuel-to-oxidizer ratio" refers to the ratio of fuel-to-oxidizer. The fuel-to-oxidizer ratio, $\phi$, can have a number of effects in combustion synthesis. Smoldering combustion synthesis with $\phi<0.7$ typically has a maximum temperature lower than 600° C., volume combustion synthesis typically is carried out with $\phi$ between 0.7 and 1.2 and gives combustion temperatures between 1150° C. and 1350° C., and self-propagating high temperature synthesis typically is carried out with $\phi$ between 1.2 and 1.6 and gives combustion temperatures between 800° C. and 1100° C. Typically, increasing the amount of fuel increases the crystallinity of the products. However, higher temperatures can decrease the surface area of the products. The fuel-to-oxidizer ratio can typically be optimized to produce a desired balance between crystallinity and particle size.

The ratio of fuel-to-oxidizer can be defined as:

$$\Phi_e = \frac{\sum (\text{coefficient of oxidizing elements in specific formula}) \times (\text{valency})}{(-1)\sum (\text{coefficient of reducing elements in specific formula}) \times (\text{valency})} \quad (1)$$

the mixture of nitrate to fuel stoichiometry can be defined as fuel lean if $\phi>1$, fuel rich when $\phi<1$, and stoichiometric when $\phi=1$.

"Metal boride" refers to a substance whose chemical formula can be written as $MB_x$, where M is a metal. Alkaline earth metals, rare-earth metals, and thorium typically form borides of the $MB_6$ type. Some metals, such as ytterbium, form compounds having the formula $MB_{12}$. In particular implementations, the present disclosure provides a method for forming rare-earth metal hexaborides, such as hexaborides of lanthanum, samarium, or yttrium. In other implementations, the metal is an alkaline earth metal, such as calcium, barium or strontium, or another metal, such as thorium or zirconium.

The crystal structure of $MB_6$ compounds generally consists of a three-dimensional boron structure surrounding the metal atoms. The framework of the boron structure has an octahedron at each corner of a cube, bonded at their apexes. A homopolar lattice structure with a coordination number of 5 is formed by the boron atoms, with four adjacent neighbors in every octahedron for every boron atom, and one on the main axes of the cube. The valence electrons of boron are distributed over five bonds.

The metal atoms with a coordination number of 24 are trapped in the boron cage. The boron has no bonds with the metal atom inside its cage. The metal atoms thus provide free electrons to the compound, giving a metallic character to some of these materials.

Hexaboride materials can be used for a number of applications, such as in optical applications and electronics applications. For example, lanthanum hexaboride can be used in glass coatings to reject heat. Lanthanum hexaboride cathodes can be used as thermal electron emitters. The peak emission density of lanthanum hexaboride is >100 A/cm², which is higher than other materials typically used as thermal cathodes. Because of its sublimation ratio, $LaB_6$ generally has a more favorable ratio of emission when compared to other metallic emitters, such as tungsten, for a given life cycle. If not poisoned, the $LaB_6$ can operate at relatively low pressures ($10^{-6}$ mm Hg). When compared with tungsten, hairpin $LaB_6$ cathodes can offer up to 10 times the brightness and longer life than conventional cathode materials. Table 1 lists the electron emission constants for some hexaboride compounds.

TABLE 1

Electron emission constants of some hexaborides.

| Boride | A(amps/cm²/degK²) | $\phi$ (volts) |
|---|---|---|
| $CaB_6$ | 2.6 | 2.86 |
| $SrB_6$ | 0.14 | 2.67 |
| $BaB_6$ | 16 | 3.45 |
| $LaB_6$ | 29 | 2.66 |
| $CeB_6$ | 3.6 | 2.59 |
| $ThB_6$ | 0.5 | 2.92 |

Lanthanum hexaboride cold cathodes can be used for traveling-wave tubes, klystrons, and other large vacuum apparatus. Some hexaborides, including those of lanthanum, neodymium, and gadolinium, are magnetic. $LaB_6$, which has a metallic character, transitions to a superconductor at very low temperatures. With a very low work function, hexaborides can be used in coherent electron sources.

Other hexaborides, such as those of ytterbium, europium, samarium, strontium, exhibit semiconductor properties. Boride materials, including boride compounds of rare earth elements, can be used in decorative coatings due to their coloration.

General Discussion

The overall reaction in combustion synthesis of hexaborides (and which is analogous for dodecaborides) can be described as:

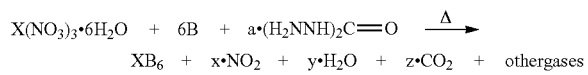

$X(NO_3)_3 \cdot 6H_2O + 6B + a \cdot (H_2NNH)_2C=O \xrightarrow{\Delta}$
$XB_6 + x \cdot NO_2 + y \cdot H_2O + z \cdot CO_2 + $ other gases X = Metal, such as La, Sm, or Y Intermediate reactions may change when the fuel-to-oxidizer ratio changes.

Various parameters can affect the combustion synthesis reaction, including the product produced or the ratio of products. One parameter is the type of fuel. The type of fuel can affect the temperature at which the combustion reaction initiates, the temperature achieved by the combustion reaction, and how the reaction is carried out. For example, solid fuels can require different production techniques than liquid fuels.

Another parameter is the metal source. Typically, the metal source is selected such that it is a compound that includes an oxidizing component. For example, nitrate salts are used in some embodiments of the disclosed method. In some cases, such as if nitrate salts are not used, or if additional oxidizer is desired, an oxidizing compound, such as a perchlorate salt or another nitrate salt, such as either ammonium nitrate or sodium perchlorate, are used in the reaction. The metal source and, optionally, an oxidizer not associated with the metal, are provided in an amount relative to the amount of fuel used in the reaction to provide a desired fuel-to-oxidizer ratio.

Particular implementations of the present disclosure involve forming compounds of boron and a rare earth element. In specific examples, the rare earth element is lanthanum, cerium, ytterbium, yttrium, samarium, praseodymium, neodymium, gadolinium, or dysprosium. Other implementations involve forming compounds of boron and an alkaline earth metal, such as calcium, strontium, or barium. According to yet another implementation, a compound of boron and zirconium is prepared. In another implementation, the compound is formed between boron and thorium. In some examples, the product includes a hexaboride or dodecaboride compound, a borate compound, or mixtures thereof.

The source of boron can affect the reaction. For example, the crystallinity and particle size of the starting boron material can influence the particle size and morphology of the combustion products. In various examples, the boron source is selected from rhombohedral boron, cubic boron, boric acid, or mixtures thereof.

As discussed above, additional parameters that can be varied for the combustion reaction include the fuel-to-oxidizer ratio, the presence or absence of a solvent, and the nature of the fuel (including whether it is a solid or liquid). The starting temperature, final temperature, and heating regimen used can also affect the combustion reaction, including the products or ratio of products produced.

In a typical reaction, the oxidizer/metal source, fuel, and boron material are mixed together. In some cases, it can be beneficial to mix the oxidizer and fuel before mixing in the boron, as it can increase the fuel-oxidizer contact. Increasing the fuel-oxidizer contact can result in a more consistent or complete combustion reaction. Particularly when a liquid fuel is used, a solvent may be used to aid mixing.

The combustion reaction is typically initiated by heating the reactants, such as by placing the precursor materials in a furnace, such as a muffle furnace. In some cases, the reactants are placed in an environment preheated to a temperature sufficient to initiate a combustion reaction. In other cases, the reactants are heated at lower temperature which is gradually increased to a temperature sufficient to initiate a combustion reaction.

In some cases, the materials produced by the combustion reaction are subjected to further processing. In one example, the materials are densified. For example, the powders can be annealed or sintered. In some examples, it may be desirable to eliminate as much porosity as practicable from the material before carrying out additional densifying treatments. For example, prior to sintering, the powders can be treated, such as by grinding. The powders can also, for example, be packed, such as using vibratory packing, to help provide an even distribution of material during sintering and to help provide a product having a desired density.

Sintering is typically carried out at a temperature of between about 1,700° C. and about 2,150° C., such as about 1,750° C. to about 2,050° C., or about 1,800° C. to about 2,000° C. In a specific example, the material is sintered at about 2,000° C. In another example, the material is sintered at about 1,800° C. In more specific examples, the powders are sintered using pressureless sintering, which can help reduce density variations in the final product. In some examples of pressureless sintering, sintering is performed under high vacuum, such as about $10^{-4}$ torr to about $10^{-6}$ torr, such as about $10^{-5}$ torr.

In addition to the final sintering temperature and the sintering pressure, sintering can be affected by a number of other parameters. For example, the rate at which the material is brought to the sintering temperature, or subsequently cooled, can affect the properties of the resulting material. In a particular example, a combustion product is heated at rate of about 5° C./minute until the maximum temperature is reached, held at the maximum temperature for a period of time, and then cooled at a rate of about 10° C./minute. The time the material is held at the sintering temperature can also influence the product's properties. In one example, the material is held at the maximum sintering temperature for about four hours. The sintering time and other parameters can be affected by various properties of the starting material, such as the particle size or thickness of material, or desired final product, such as the desired final density.

In some configurations, the combustion products are washed, such as to remove impurities, change the relative composition of products, or alter the form, such as the particle shape or size, of the combustion products. For example, when the desired product is a boride, such as a hexaboride or a dodecaboride, other compounds which may be considered as impurities when undesired, such as borates, can be removed by taking advantage of differences in solubility. In some cases, an acid wash, such as using a mineral acid, can be used to remove borates, which are typically more acid soluble than borides, from borides. Suitable acids include hydrochloric acid and sulfuric acid. In a more particular example, the combustion products are washed first with hydrochloric acid and then with sulfuric acid.

In particular examples, the combustion products have relatively small particles sizes, such as between about 50 nm and about 50,000 nm, such as between about 100 nm and about 10,000 nm, between about 150 nm and about 5000 nm, between about 150 nm and about 1000 nm, between about 150 nm and about 500 nm, or between about 150 nm and about 300 nm. In further examples, the combustion products have a relatively narrow particle size distribution, such as being distributed over a range of about 1000 nm, such as about 400 nm, 200 nm, or 150 nm. In particular examples, the distribution of particles is over a range less than about 1000 nm, such as less than about 400 nm, less than about 200 nm, or less than about 150 nm. In some cases, the particles agglomerate to form agglomerates having an average cross sectional width of between about 1 µm and about 100 µm, such as between about 10 µm and about 75 µm.

In some implementations, the combustion products include a compound having the formula $MB_6$, where M is a metal. $MB_6$-type compounds typically crystallize in a $CaB_6$ structure type (space group $Pm3m\text{-}O_h^1$) with M at (0,0,0) and B at +(x, ½, ½). This structure may be considered as a combination of two interpenetrating simple cubic lattices set apart by the vector (½, ½, ½). One lattice accommodates the metal atoms M and the other the $B_6$ octahedra, bound covalently with one another.

The valence electrons of the metal atoms in $MB_6$ compounds are not typically accepted by the $B_6$ complex, giving rise to the presence of free electrons, which can impart a metallic character to some of these compounds. This, together with the strong bonds between the boron atoms in the framework, can produce a series of compounds that have high electrical conductivities and high thermal and chemical stabilities. When this structure is heated to a sufficiently high temperature, the metal atoms at the surface can evaporate away. They are, however, often immediately replaced by diffusion of metal atoms from the underlying cells. In some cases, the boron framework does not evaporate but remains intact.

Movement of metal atoms in and out of the boron framework can be used for hydrogen storage. For example, as shown in FIG. 1, a high-surface area device absorbs hydrogen when an electric field is applied away from the hydrogen source, and then desorbs hydrogen when the field is reversed. In some hexaborides, such as lanthanum hexaboride, the average replacement time of the metal in the hexaboride framework is typically only a few seconds, so the absorption and desorption of hydrogen is rapid.

Example 1

Metal nitrates were the source of metal for the formation of the $LaB_6$ powders, while rhombohedral boron powders were, with noted exceptions, used as the boron source. These precursor materials along with the fuel (carbohydrazide) were mixed together and placed in a crystallization dish. Some procedures included deionized water for dissolving the precursor chemicals, and some procedures did not include water. In particular procedures, the precursor chemicals were thoroughly hand-mixed using a mortar and pestle. The powders were then placed in a crystallization dish and spread as a thin layer at the bottom. Table 2 lists the materials used in this Example (and Examples 2 and 3).

TABLE 2

Precursor materials for synthesis of powders.

| Material | Characteristics | Source |
|---|---|---|
| Lanthanum Nitrate $La(NO_3)_3 \cdot 6H_2O$ | Purity: 99.99% No. 11267 | Alfa Aesar Ward Hill, MA |
| Samarium Nitrate $Sm(NO_3)_3 \cdot 6H_2O$ | Purity: 99.99% No. 11224 | Alfa Aesar Ward Hill, MA |
| Yttrium Nitrate $Y(NO_3)_3 \cdot 6H_2O$ | Purity: 99.9% No. 11187 | Alfa Aesar Ward Hill, MA |
| Carbohydrazide $CO(NHNH_2)_2$ | Purity: 98% No. C11006 | Sigma-Aldrich St. Louis, MO |
| Hydrazine $NH_2NH_2$ | Purity: 98% No. 215155 | Sigma-Aldrich St. Louis, MO |
| Glycine $NH_2CH_2COOH$ | Purity: ≥99% No. G7126 | Sigma-Aldrich St. Louis, MO |
| Urea $NH_2CONH_2$ | Purity: ≥99.5% No. U2150 | Sigma-Aldrich Inc. St. Louis, MO |
| Boric Acid $H_3BO_3$ | Purity: ≥99.5% No. B0252 | Sigma-Aldrich Inc. St. Louis, MO |
| Cubic Boron | Purity: 98% No. 40036 | Alfa Aesar Ward Hill, MA |
| Rhombohedral Boron | Submicron No. 332445 | Sigma-Aldrich Inc. St. Louis, MO |
| Rhombohedral Boron | 200-500 nm | Noval Industrial Group Shandong, China |
| Hydrochloric Acid | No. A481-212 | Fisher Scientific |
| Sulfuric Acid | No. A298-212 | Fisher Scientific |
| Hydrofluoric Acid | A513-500 | Fisher Scientific |

In a typical reaction, reactant chemicals were hand mixed in the order of nitrate, carbohydrazide, and boron. Mixing the boron with nitrates before carbohydrazide addition can hinder the combustion reaction, as boron may limit direct contact between nitrate and fuel. The crystallization dish containing the reactants was placed in a muffle furnace for the combustion reaction.

Synthesis reactions were initiated using two different techniques. The first introduced the crystallization dish along with the precursor chemicals into the muffle furnace at 500° C., while the second introduced the crystallization dish with chemicals into the muffle furnace at room temperature followed by heating to ignition.

Figure 2:
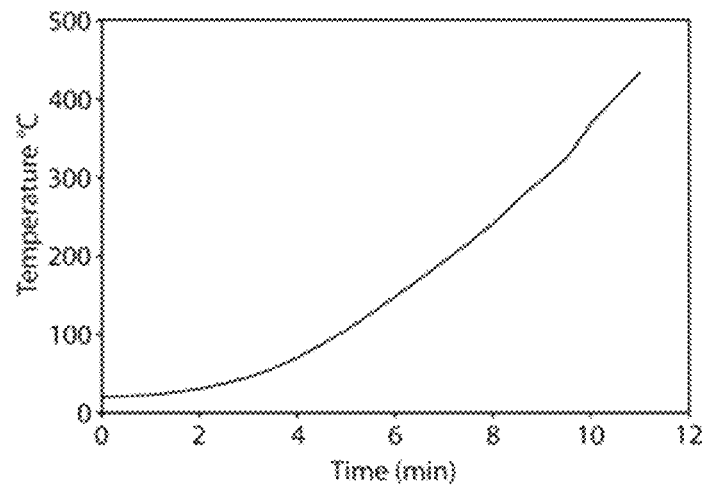
FIG. 2 is a graph of temperature (° C.) versus time (minutes) showing the heating rate of a muffle furnace used in a particular embodiment of the disclosed method.

When the chemicals were introduced into the muffle furnace at room temperature and then heated, the reaction typically occurred in the temperature range of 250° C. to 300° C. The heating rate of the furnace is shown in FIG. 2. From this figure, a rough estimate of the heating rate of the furnace is ~30-35° C./min. The temperature of the furnace at various locations may vary somewhat from the temperature reported by the furnace, depending on the relative location of the reactants and the temperature probe within the furnace.

A number of boron sources were used in this Example. The first source of boron, referred to as B1 (surface area=9.9731 $m^2/g$), was purchased from Sigma-Aldrich. The second boron source, referred to as B2 (surface area=17.1225 $m^2/g$), was obtained from Noval Industrial Group. Both B1 and B2 had rhombohedral crystal structures in the as-received state. A few materials were created using a third source of boron powder, obtained from Alfa Aesar. Alfa Aesar boron powders had cubic crystal structure in the as-received state and thus will be hereafter referred to as cubic boron.

A Fritsch P5 planetary high-energy ball mill (Fritsch GmbH, Idar-Oberstein, Germany) was used to mill some of the as-received powders from Sigma-Aldrich (B1). The milling media used was zirconia vials and zirconia balls. The speed of the main disk was 400 rpm and the relative ratio of the main disk speed to the secondary disk speed was −4.12.

The milling time was 3 hours and the ball to powder ratio was 10:1. The mass of material milled was 30 g.

Reactants for particular synthetic runs are listed in Table 3.

TABLE 3

Amount of reactants and synthetic procedure for different materials.

| Precursors | Fuel-to-oxidizer Ratio | Synthesis Procedure |
|---|---|---|
| Lanthanum Nitrate: 10.6253 g<br>Boron: 1.5915 g<br>Carbohydrazide: 0.5526 g | 0.0833 | 1, 4, 5 |
| Lanthanum Nitrate: 10.6253 g<br>Boron: 1.5915 g<br>Carbohydrazide: 1.1053 g | 0.1666 | 1, 3, 4, 5 |
| Lanthanum Nitrate: 10.6253 g<br>Boron: 1.5915 g<br>Carbohydrazide: 1.6579 g | 0.25 | 3, 4 |
| Lanthanum Nitrate: 10.6253 g<br>Boron: 1.5915 g<br>Carbohydrazide: 2.2105 g | 0.3333 | 1, 4 |
| Lanthanum Nitrate: 10.6253 g<br>Boron: 1.5915 g<br>Carbohydrazide: 4.4210 g | 0.6666 | 1 |
| Lanthanum Nitrate: 10.6253 g<br>Boron: 1.5915 g<br>Carbohydrazide: 8.8420 g | 1.3333 | 1 |
| Lanthanum Nitrate: 10.6253 g<br>Boron: 1.5915 g<br>Hydrazine: 0.3932 g | 0.1666 | 1, 2, 4, 8 |
| Lanthanum Nitrate: 10.6253 g<br>Boron: 1.5915 g<br>Hydrazine: 0.7863 g | 0.3333 | 8 |
| Lanthanum Nitrate: 10.6253 g<br>Boron: 1.5915 g<br>Glycine: 1.8420 g | 0.3333 | 1, 4 |
| Lanthanum Nitrate: 10.6253 g<br>Boric Acid: 9.1012 g<br>Urea: 0.7368 g | 0.1666 | 1 |
| Lanthanum Nitrate: 10.6253 g<br>Boric Acid: 9.1012 g<br>Carbohydrazide: 1.1053 g | 0.1666 | 1 |
| Ammonium Nitrate: 1.8649 g<br>Lanthanum Nitrate: 6.0183 g<br>Boron: 1.5915 g<br>Carbohydrazide: 0.5526 g | 0.0833 | 1, 4 |
| Ammonium Nitrate: 1.8649 g<br>Lanthanum Nitrate: 6.0183 g<br>Boron: 1.5915 g<br>Carbohydrazide: 1.1053 g | 0.1666 | 1 |
| Ammonium Nitrate: 1.8649 g<br>Lanthanum Nitrate: 6.0183 g<br>Boron: 1.5915 g<br>Carbohydrazide: 2.2105 g | 0.3333 | 1, 4 |
| Samarium Nitrate: 10.3259 g<br>Boron: 1.5068 g<br>Carbohydrazide: 0.5232 g | 0.0833 | 4 |
| Yttrium Nitrate: 12.4547 g<br>Boron: 2.1091 g<br>Carbohydrazide: 1.4647 g | 0.1666 | 4 |

The above table lists various synthesis procedures use in this Example (and Examples 2 and 3). The following discussion describes each procedure.

Procedure 1: Reactants were dissolved using a small amount of de-ionized water. The crystallization dish along with the precursor material solution was introduced into the muffle furnace, which was pre-heated to 500° C.

Procedure 2: The reactants were dissolved using a small amount of de-ionized water. The crystallization dish along with the precursor material solution was introduced into the muffle furnace, which was at room temperature. The furnace was heated along with the reactant chemicals at a moderate rate until the combustion reaction occurred.

Procedure 3: Reactants were hand mixed using a mortar and pestle. The hand mixed reactant chemicals were spread as a thin layer at the bottom of the crystallization dish. The order followed for hand mixing was nitrate-fuel-boron source. The crystallization dish along with the precursor materials was introduced into the muffle furnace pre-heated to 500° C.

Procedure 4: Reactants were hand mixed using a mortar and pestle. The hand mixed reactant chemicals were spread as a thin layer at the bottom of the crystallization dish. The order followed for hand mixing was nitrate-fuel-boron source. The crystallization dish along with the precursor material was introduced into the muffle furnace at room temperature. The furnace was heated along with the reactant chemicals at a moderate rate of ~30° C./min until the combustion reaction occurred.

Procedure 5: Reactants were hand mixed using a mortar and pestle. The hand mixed reactant chemicals were spread as a thin layer at the bottom of a 2-liter autoclave. The order followed for hand mixing was nitrate-fuel-boron source. The autoclave was purged with argon continuously for 15 minutes and then sealed. The autoclave was heated along with the reactant chemicals at a moderate rate until the combustion reaction occurred. Combustion reaction occurrence was indicated by a rapid pressure increase. After the reaction, the products were cooled to room temperature with a continuous argon flow.

Procedure 6: Reactants, except fuel, were hand mixed using a mortar and pestle. The hand mixed reactant chemicals were spread as a thin layer at the bottom of a crystallization dish. The fuel used was hydrazine, a liquid. The fuel was sprinkled on top of the reactant chemicals. The crystallization dish along with the precursor material was introduced into the muffle furnace at 500° C.

Procedure 7: Reactants, except fuel, were hand mixed using a mortar and pestle. The hand mixed reactant chemicals were spread as a thin layer at the bottom of a crystallization dish. Liquid hydrazine fuel was sprinkled on top of the reactant chemicals. The crystallization dish was introduced into the muffle furnace at room temperature. The furnace was heated along with the reactant chemicals at a moderate rate of ~30° C./min until the combustion reaction occurred.

Procedure 8: Reactants, except fuel, were hand mixed using a mortar and pestle. The hand mixed reactant chemicals were spread as a thin layer at the bottom of a 2-liter autoclave. Liquid hydrazine fuel was sprinkled on top of the reactants. The autoclave was purged with argon continuously for 15 minutes and then sealed. The autoclave was heated along with the reactant chemicals at a moderate rate until the combustion reaction occurred, as indicated by a rapid increase in pressure. After reaction, the products were cooled to room temperature with a continuous argon flow.

In addition to $LaB_6$, certain reactions produced $LaBO_3$. $LaBO_3$ is a material that shows high VUV (vacuum UV) transparency and high optical damage thresholds. Although $LaBO_3$ may be viewed as a contaminant when $LaB_6$ is desired, the present disclosure and Example can be modified to increase $LaBO_3$ (or other metal borate) when that material is desired.

Characterization

X-ray diffractometers (Philips 3100 and Philips PW 1800) were used to determine the different phases present in the powders. Scanning electron microscopy (Hitachi S-4700 and FEI Quanta 200F) was used to study the morphology of the powders. X-ray photoelectron spectroscopy (PHI Quantera SXM) and Fourier transform infrared spectroscopy (Nicolet Nexus 670 Mid-infrared) were used to determine the impurities of the powders. Differential scanning calorimetry (TA Instruments DSC Q10) was used to study the different intermediate thermal stages that occurred during the progress of the reaction/synthesis. Surface area measurements (BET) were made using a Micromeritics Tristar Surface Area and Porosity Analyzer.

For the XRD studies, powders were ground by hand using a mortar and pestle and then spread evenly on the surface of the sample holder. The powders were slightly tapped to form a smooth surface. XRD was performed using CuKα radiation. For SEM, samples were prepared by two methods. In the primary method, the ground powders were diluted in acetone and dropped onto a silicon wafer. In the secondary method, the ground powders were sprinkled on a stub with carbon tape. X-ray photoelectron spectroscopy, Fourier transform infrared spectroscopy, and surface area measurements used lightly ground powders with no other preparation procedures. For the case of differential scanning calorimetry, the reaction was carried out using Procedure 4.

Figure 3:
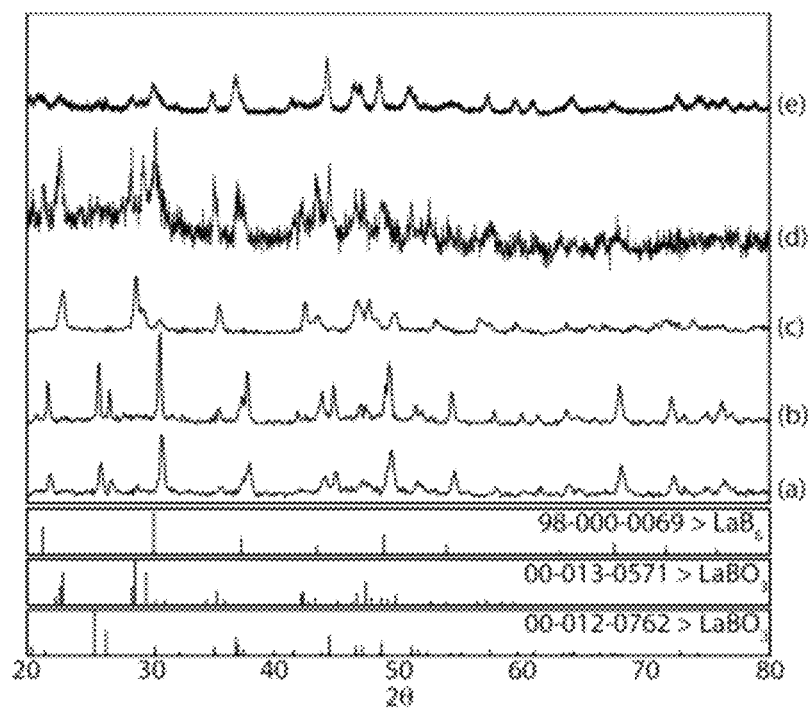
FIG. 3 presents x-ray diffraction patterns for materials synthesized from lanthanum nitrate, carbohydrazide, and B1 boron in water using Procedure 1 at fuel-to-oxidizer (F/O) ratios of 0.0833 (a), 0.1666 (b), 0.3333 (c), 0.6666 (d), and 1.3333 (e).

Nitrate-Carbohydrazide Reaction with Water and without Water $La(NO_3)_3 \cdot 6H_2O$, rhombohedral boron (B1), and carbohydrazide were reacted using Procedure 1. The x-ray diffraction results of the synthesized powders with different fuel-to-oxidizer (F/O) ratios are shown in FIG. 3. F/O ratios ranged from 1.3333 to 0.6666.

FIG. 3(d) (F/O=0.6666) and FIG. 3(e) (F/O=1.3333) show the x-ray diffraction results for these powders. The x-ray diffraction results reveal a mixed phase that includes $LaBO_3$ (PDF#013-057, PDF#012-0762). At higher fuel-to-oxidizer ratios, pure $LaBO_3$ was obtained.

Combustion reactions did not occur with any further reductions in the F/O ratio beyond 0.0833. Higher amounts of heat favor production of $LaBO_3$. Conversely, $LaB_6$ formation is favored when the heat provided to the system is low.

Since higher heat in the system results in the formation of oxides, as demonstrated from reactions using higher F/O ratios, the reactants were reacted without placing them in a furnace pre-heated to 500° C. Using Procedure 4, described above, the reactants were placed in the furnace at room temperature and then heated until the combustion reaction took place. Similar reactions were carried out using Procedure 2, which employed water. The results from Procedure 2 were similar to those obtained using Procedure 1, as the water did not evaporate until the furnace temperature reached 500° C.

Figure 4:
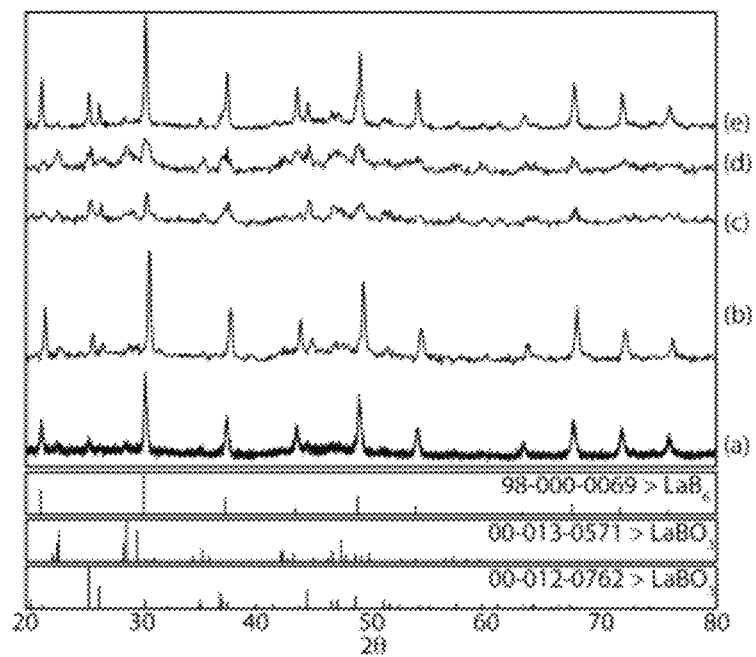
FIG. 4 illustrates x-ray diffraction patterns for materials synthesized from lanthanum nitrate, carbohydrazide, and B1 boron using Procedure 4 at fuel-to-oxidizer (F/O) ratios of 0.0833 (a), 0.1666 (b), 0.25 (c), 0.3333 (d), and using Procedure 3 (320° C.) at a F/O ratio of 0.0833 (e).

X-ray diffraction results for the powders synthesized by Procedure 4 are shown in FIG. 4. The patterns in FIG. 4(c) (F/O=0.25) and FIG. 4(d) (F/O=0.3333) still have considerable amounts of $LaBO_3$ (PDF#012-0762), but the patterns in FIG. 4(a) (F/O=0.0833) and FIG. 4(b) (F/O=0.1666) have well-defined $LaB_6$ peaks (PDF#98-000-069).

These results demonstrate that when the reactants are heated from room temperature, the boride phase is favored. The furnace in Procedure 4 never reached the 500° C. temperature used in Procedure 1. Thus, it appears that the reactants do not experience enough heat for significant oxide formation when heated from a lower temperature to the initiation temperature.

The ignition temperature for the reaction, which has been found to be lower than 400° C., will be discussed later in this Example. These results also demonstrate that when the reactions were performed with water the temperature of the reactant mixture was maintained at the boiling point of the water until all water evaporated. After evaporation of all the water, the reactants heated to the prevailing oven temperature, 500° C., which favors oxide formation.

Figure 5:
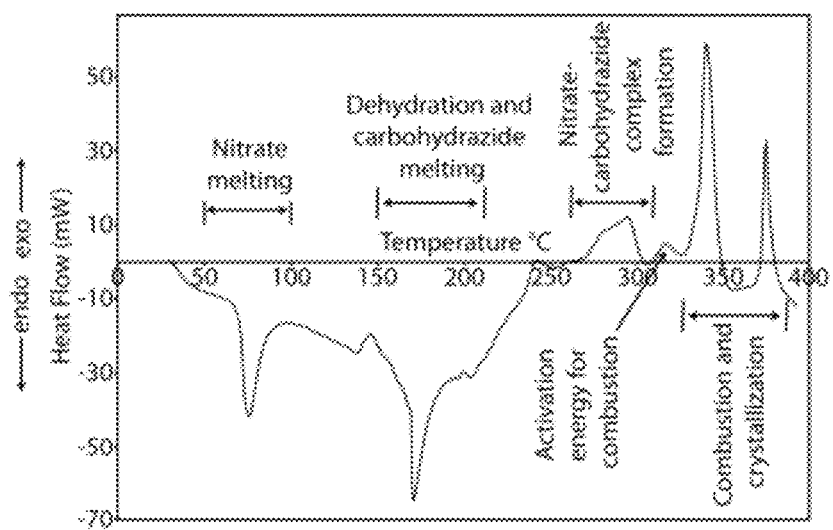
FIG. 5 presents a differential scanning calorimetry curve for lanthanum hexaboride synthesized with lanthanum nitrate, carbohydrazide, and B1 boron at a fuel-to-oxidizer (F/O) ratio of 0.25.

FIG. 5 shows the thermal analysis curves, using differential scanning calorimetry, for the combustion reaction. The analysis was initiated at room temperature and heated to 400° C., with a heating rate of 20° C.·min$^{-1}$. The powders were prepared in a similar fashion as for the normal combustion reaction, i.e., hand mixed with a mortar and pestle. During heating, an endothermic peak was observed at 75.88° C., likely due to melting of nitrates.

The significant endothermic peak at 170.45° C. is likely due to the loss of waters of hydration from the reactants and from carbohydrazide melting. Without intending to be limited by theory, the broad exothermic peak between 260-300° C. is believed to be due to the formation of a complex between carbohydrazide and nitrate ions. The small exothermic peak at 318° C. is likely the activation peak for the trigger and actual combustion reaction. Significant exothermic peaks observed at 339.39° C. and 379.39° C. may be due to the actual combustion and crystallization processes occurring at the time of combustion. From these results, it is believed that complex formation between carbohydrazide and nitrate plays a role in forming the boride species rather than the oxide.

To establish that the processes occurring at about 260-300° C. plays a role in boride formation, a reaction was carried out where the reactant chemicals were introduced into the furnace at 320° C., which is believed to be the activation temperature for the combustion reaction.

FIG. 4(e) shows the XRD results of the materials synthesized at 320° C. From the results it can be noticed that a considerable amount of $LaBO_3$ (PDF#012-0762) was observed along with the formation of well-defined peaks attributed to $LaB_6$ (PDF#98-000-069). This evidence supports that heating the reactants to the combustion temperature in a manner that allows for oxidizer-fuel complexation favors the boride phase.

Figure 6:
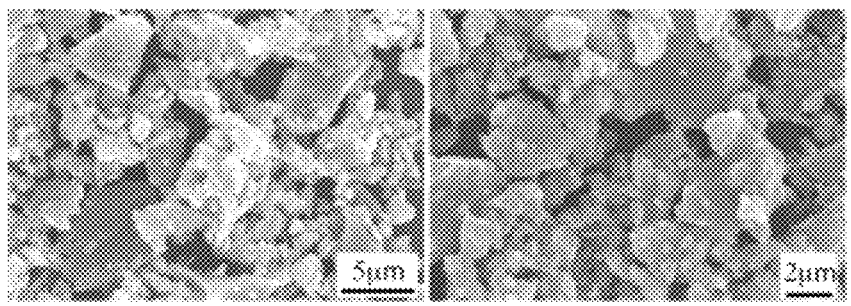
FIG. 6 presents SEM micrographs of materials prepared from lanthanum nitrate, carbohydrazide, and B1 boron using Procedure 4 at a fuel-to-oxidizer (F/O) ratio of 0.1666.
Figure 7:
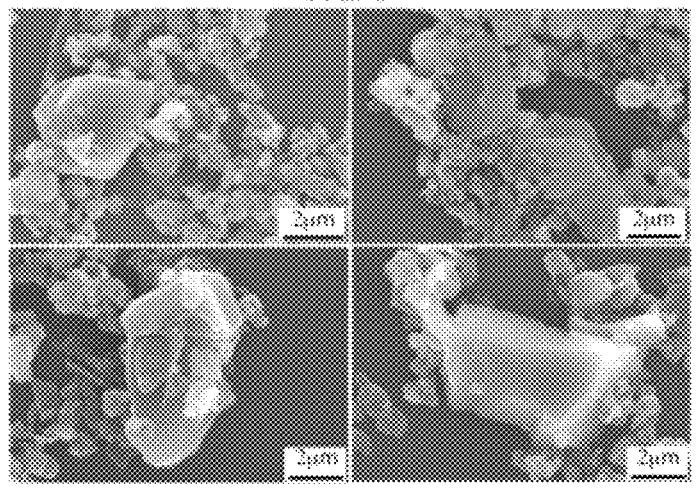
FIG. 7 presents SEM micrographs of rhombohedral boron.

SEM micrographs of the as-synthesized materials with F/O=0.1666 are presented in FIG. 6. The morphology of the materials is somewhat faceted in nature. The formation of this morphology can be explained by looking at the initial morphology of the precursor boron material. FIG. 7 shows the SEM micrographs of as-received rhombohedral boron powders (B1), which also exhibits a faceted structure, suggesting that the morphology of the $LaB_6$ powders is derived from the initial morphology of the B1 powders.

Modifications to Fuel Source

Different fuels can produce different amounts of heat for the combustion reaction. To study the effect of different fuels on the combustion reaction, hydrazine was used in place of carbohydrazide in some reactions. Hydrazine reactions having F/O=0.1666 were conducted using Procedures 1, 2, and 7.

As it is a liquid, a dispersion medium was used with hydrazine in order to adequately mix the hydrazine and other reactants. In this Example, water was used as the dispersing medium. The hydrazine employed in this Example was anhydrous and, when mixed with water, formed a stable hydrate.

Figure 8:
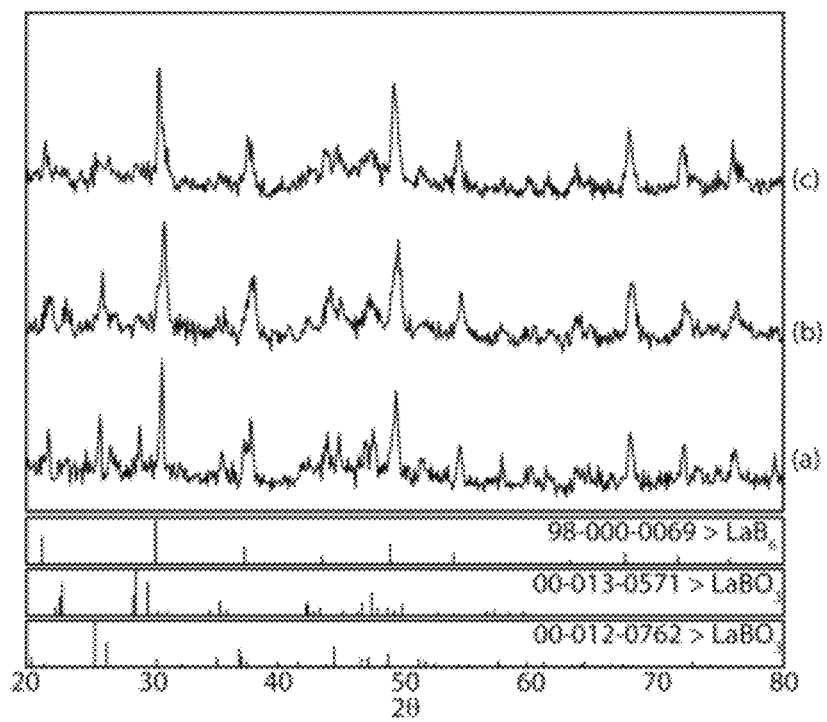
FIG. 8 illustrates x-ray diffraction patterns for materials synthesized from lanthanum nitrate, hydrazine, and B1 boron at a fuel-to-oxidizer (F/O) ratio of 0.1666 using Procedure 7 (a), Procedure 2 (b), and Procedure 1 (c).

FIG. 8 shows the x-ray diffraction results for materials synthesized using hydrazine according to Procedure 1. $LaB_6$ is evident (PDF#98-000-069), but the peaks were not well defined. The presence of double peaks suggests that the crystal structure is distorted or boron-deficient $LaB_6$ formed.

The pattern in FIG. 8(b) shows the x-ray diffraction results for materials synthesized using Procedure 2. The pattern shows defined peaks corresponding to $LaBO_3$ (PDF#012-0762, PDF#013-0571) and $LaB_6$ (PDF#98-000-069). The diffraction peaks look very similar to the pattern in FIG. 8(c) (from material prepared using Procedure 1).

The pattern in FIG. 8(a) shows the x-ray diffraction results of materials synthesized using Procedure 7. X-ray diffraction results show defined peaks corresponding to $LaBO_3$ (PDF#012-0762, PDF#013-0571) and $LaB_6$ (PDF#98-000-069). The appearance of double peaks also implies the formation of a distorted crystal structure. The formation of a stable hydrate when anhydrous hydrazine was mixed with water might be responsible for slowing the reaction mechanisms for the reactions that were performed in the presence of water. One advantage of carbohydrazide over hydrazine is that the solid carbohydrazide can be more easily mixed with the other solid reactants, which can produce more complete and consistent reactions.

Figure 9:
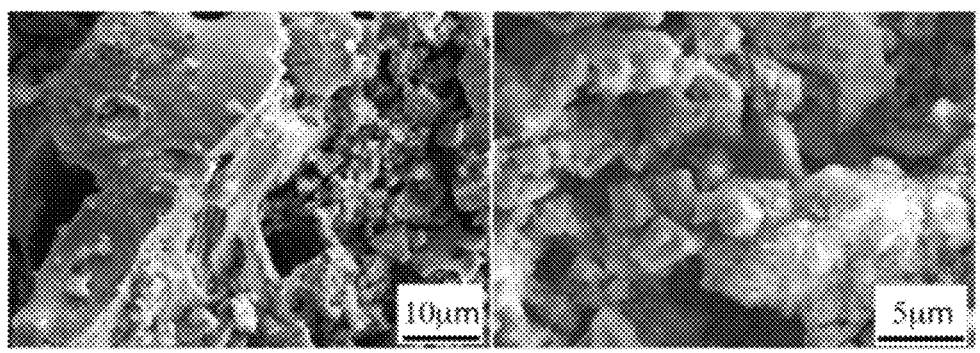
FIG. 9 presents SEM micrographs of materials synthesized from lanthanum nitrate, hydrazine, and B1 boron using Procedure 7 at a fuel-to-oxidizer (F/O) ratio of 0.1666.

SEM micrographs of the as-synthesized materials corresponding to the pattern in FIG. 8(a) are shown in FIG. 9. The micrographs in FIG. 9 reveal the formation of large agglomerates in the range of ~50 μm in size, which do not resemble the plate-like structure formation in FIG. 6. The initial particle size of the as-received B1 powders was in the range of <1 μm to 10 μm. The agglomerate size of the particles observed in FIG. 9 is around ~50 μm. Thus, unlike the carbohydrazide reactions, the morphology of the products does not appear to be consistent with the morphology of the boron source.

Nitrate-Glycine Reaction

In addition to hydrazine, glycine was also investigated as a fuel source for combustion synthesis. Reactions were carried out using Procedures 1 and 4 with a F/O of 0.3333. F/O ratios lower than 0.3333 did not result in a combustion reaction.

Figure 10:
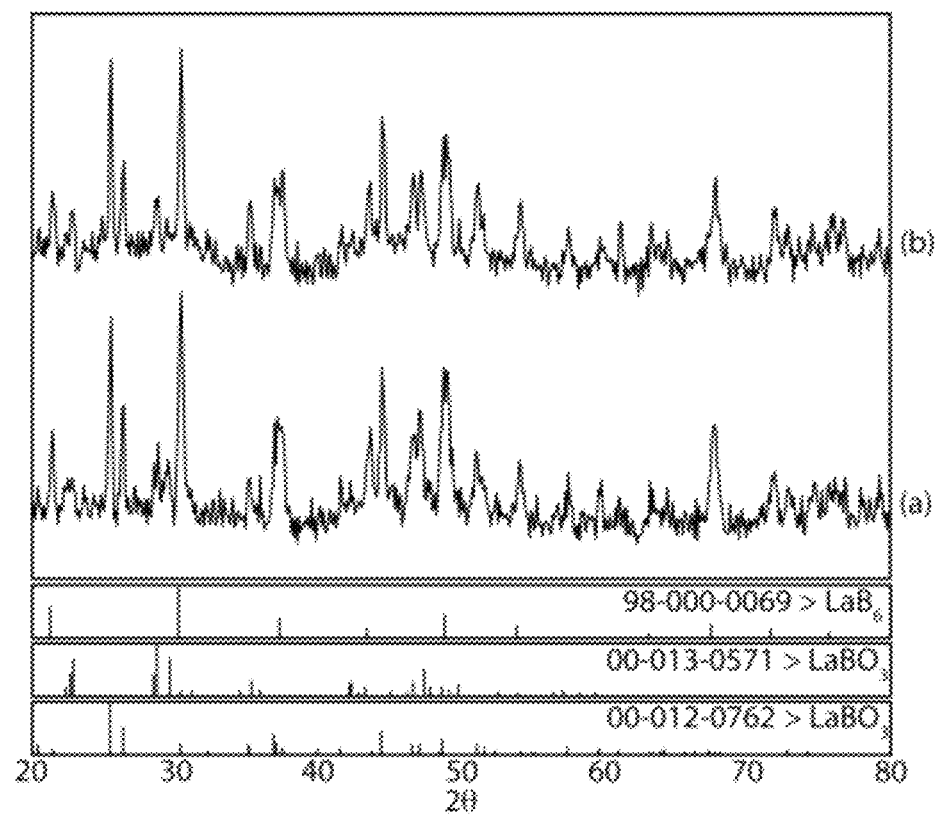
FIG. 10 illustrates x-ray diffraction patterns for materials synthesized from lanthanum nitrate, glycine, and B1 boron at a fuel-to-oxidizer (F/O) ratio of 0.3333 using Procedure 4 (a) and Procedure 1 (b).

The pattern in FIG. 10(b) shows diffraction peaks corresponding to materials that were synthesized using Procedure 1. The pattern in FIG. 10(a) reveals diffraction peaks corresponding to materials synthesized using Procedure 4. The two patterns look almost identical. All the peaks match $LaBO_3$ (PDF#012-0762, PDF#013-0571) and $LaB_6$ (PDF#98-000-069). Thus, borate also forms when glycine was used as the fuel.

Figure 11:
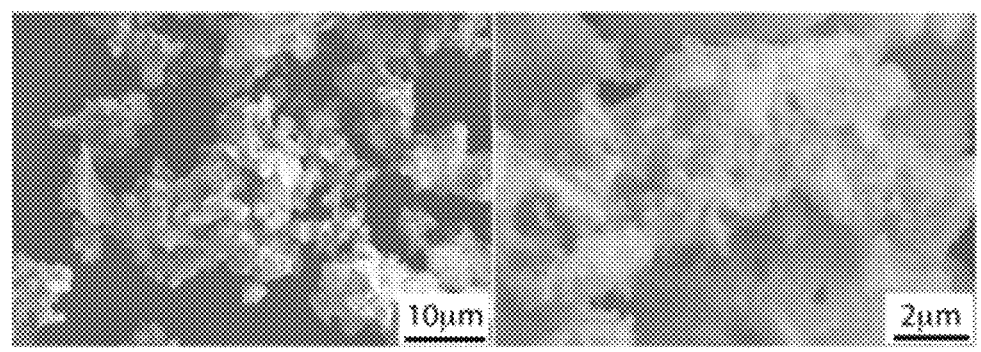
FIG. 11 presents SEM micrographs of materials synthesized from lanthanum nitrate, glycine, and B1 boron using Procedure 4 with a fuel-to-oxidizer (F/O) ratio of 0.3333.

FIG. 11 shows the SEM micrographs of the as-synthesized powders with glycine as the fuel at F/O=0.3333. After analyzing the micrographs, the particle size was found to be less than 1 μm, while the agglomerate size was in the range of 5-10 μm. Glycine requires more energy to break down compared with carbohydrazide because of strong C—C and C—O bonds in glycine versus weak N—N bonds and C—N bonds in carbohydrazide. The difficulty in breaking down glycine may lead to higher reaction temperatures, favoring borate formation.

Modifications to Boron Precursor

Figure 12:
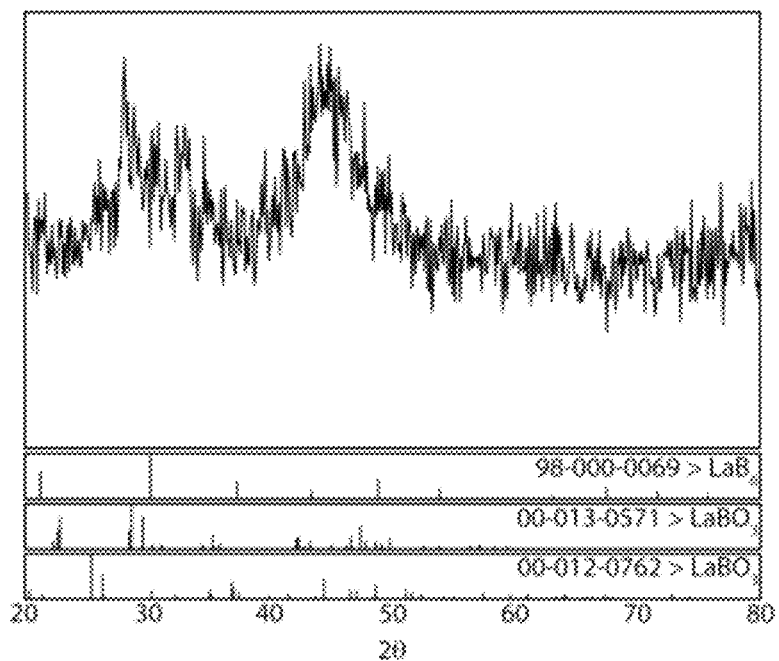
FIG. 12 illustrates x-ray diffraction patterns for materials synthesized from lanthanum nitrate and boric acid using Procedure 1 with carbohydrazide as the fuel in a fuel-to-oxidizer ratio (F/O) of 0.1666.

Boric acid and cubic boron were explored as boron reactants. FIG. 12 shows the x-ray diffraction results for materials synthesized with boric acid. Carbohydrazide was used as fuel with an F/O of 0.1666. The x-ray diffraction data suggest that the materials are amorphous in nature, having a characteristic broad hump.

Figure 13:
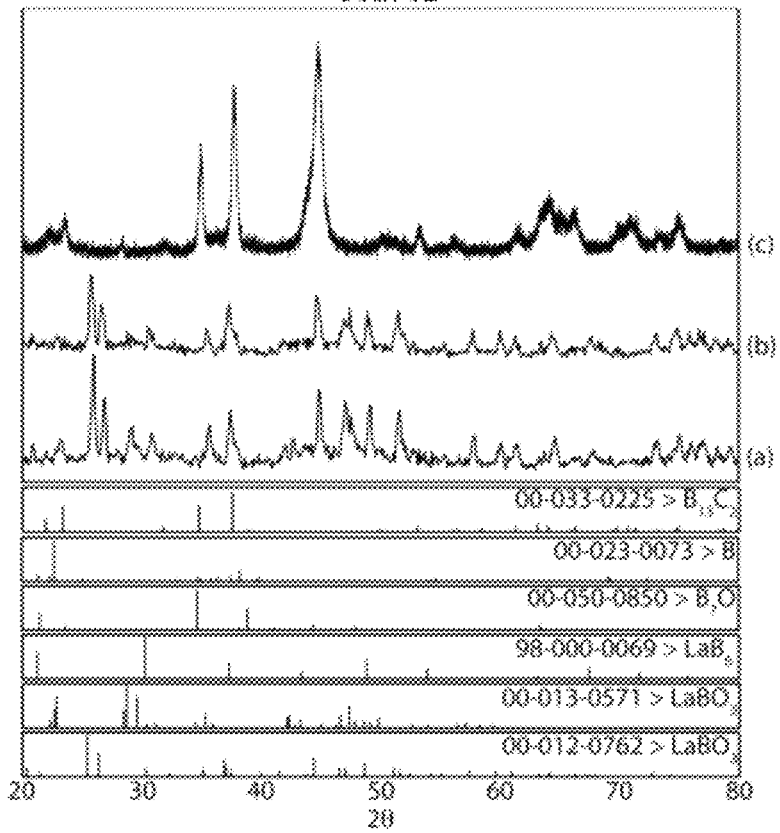
FIG. 13 illustrates x-ray diffraction patterns for materials synthesized from lanthanum nitrate, carbohydrazide, and cubic boron using Procedure 2 at fuel-to-oxidizer ratios (F/O) of 0.0833 (a) and 0.1666 (b), and of the boron source material (c).

Boron having a cubic crystal structure (Alfa Aesar) was also investigated as a boron reactant. FIG. 13 shows the x-ray diffraction results for $LaB_6$ prepared using cubic boron at F/O=0.1666 and F/O=0.0833. Both the patterns show peaks that correspond to $LaBO_3$ (PDF#012-0762). However, it was discovered from XRD data that the cubic boron source also contained $B_{13}C_2$ (PDF#00-033-0225) and $B_7O$ (PDF#00-050-0850). These impurities may affect the thermodynamics of the system, resulting in more borate than when the B1 and B2 sources were used.

Figure 14:
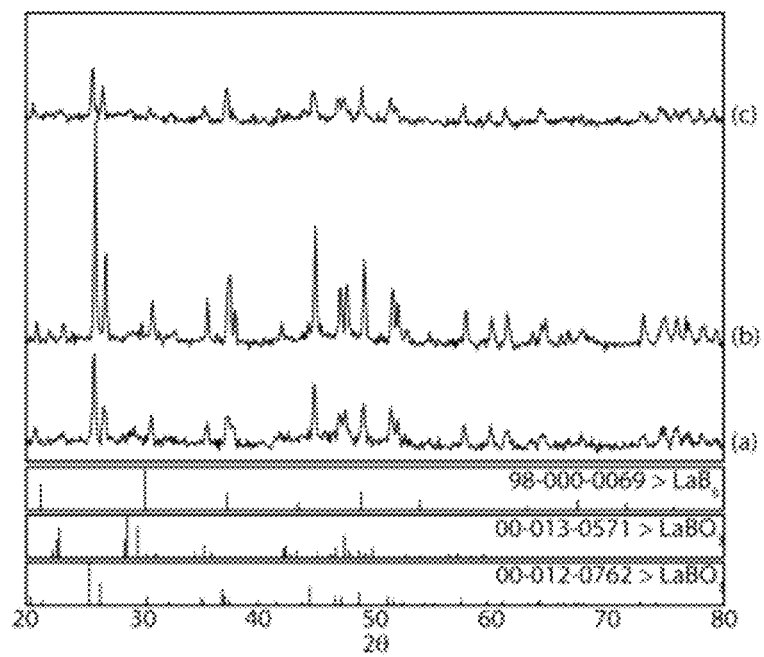
FIG. 14 illustrates x-ray diffraction patterns for materials synthesized from lanthanum nitrate, carbohydrazide, and cubic boron in Procedure 4 at fuel-to-oxidizer (F/O) ratios of 0.0833 (a), 0.1666 (b), and 0.3333 (c).

FIG. 14 shows x-ray diffraction data for materials synthesized with cubic boron, carbohydrazide, and metal nitrate using Procedure 4. FIG. 14(c) is an x-ray diffraction pattern corresponding to F/O=0.3333 showing the peaks for $LaBO_3$ (PDF#012-0762). FIG. 14(b) shows the x-ray diffraction pattern corresponding to F/O=0.1666, having peaks for $LaBO_3$ (PDF#012-0762, PDF#013-0571) and $LaB_6$ (PDF#98-000-0069). FIG. 14(a) shows the x-ray diffraction pattern that corresponds to F/O=0.0833 having $LaBO_3$ peaks (PDF#012-0762, PDF#013-0571) and a $LaB_6$ peak (PDF#98-000-0069).

These results demonstrate no significant differences between materials synthesized with and without water. Thus, cubic boron appears to form mixed borate and boride phases more than the B1 and B2 boron sources. However, this could be a result of the contamination with $B_{13}C_2$ and $B_7O$, as described above.

Figure 15:
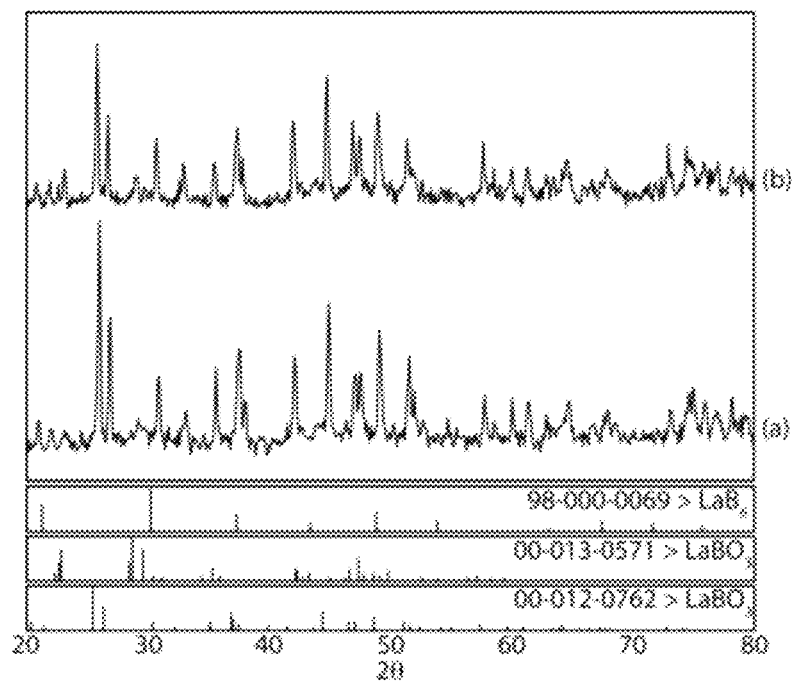
FIG. 15 illustrates x-ray diffraction patterns for materials synthesized from lanthanum nitrate, carbohydrazide, and milled B1 boron using Procedure 4 at a fuel-to-oxidizer (F/O) ratio of 0.1666 where the boron was milled with water (a) or milled with alcohol (b).
Figure 16:
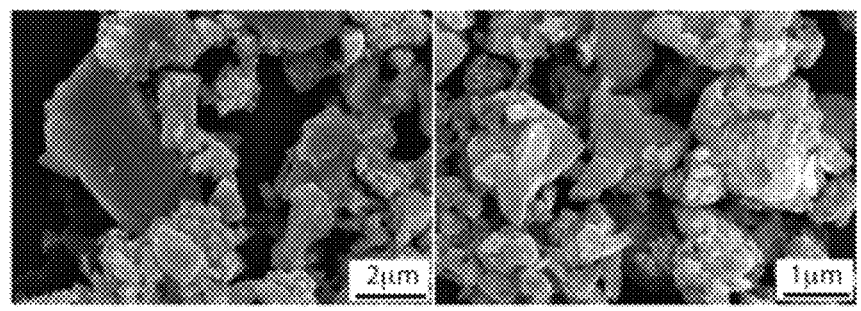
FIG. 16 presents SEM micrographs of $LaB_6$ prepared using B1 boron milled with water in Procedure 4.
Figure 17:
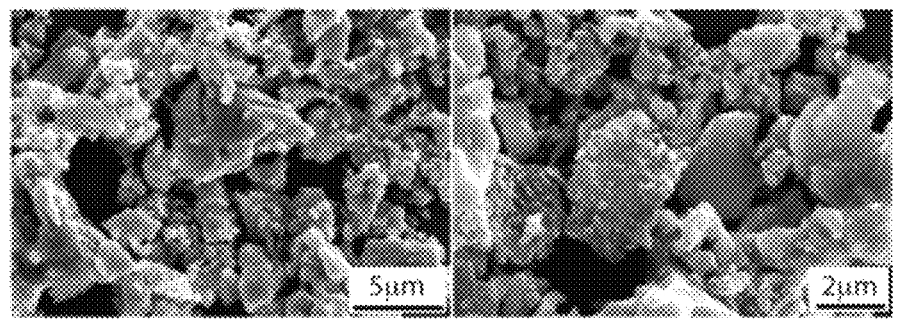
FIG. 17 presents SEM micrographs of $LaB_6$ prepared using B1 boron milled with ethanol in Procedure 4.

FIG. 6 shows faceted structures in the as-synthesized powders using carbohydrazide fuel at F/O=0.1666 using Procedure 4. As described above, the morphology of the B1 powders can influence the morphology of the products. High energy ball milling of boron was performed in two separate media, de-ionized water and ethanol. After the milling, the powders were centrifuged and air-dried. Reactions using carbohydrazide at F/O=0.1666 in Procedure 4 resulted in smaller sized particles (FIGS. 16-17), but having more $LaBO_3$ (FIG. 15) than materials formed using un-milled boron (FIG. 6).

Cleaning Techniques

Figure 18:
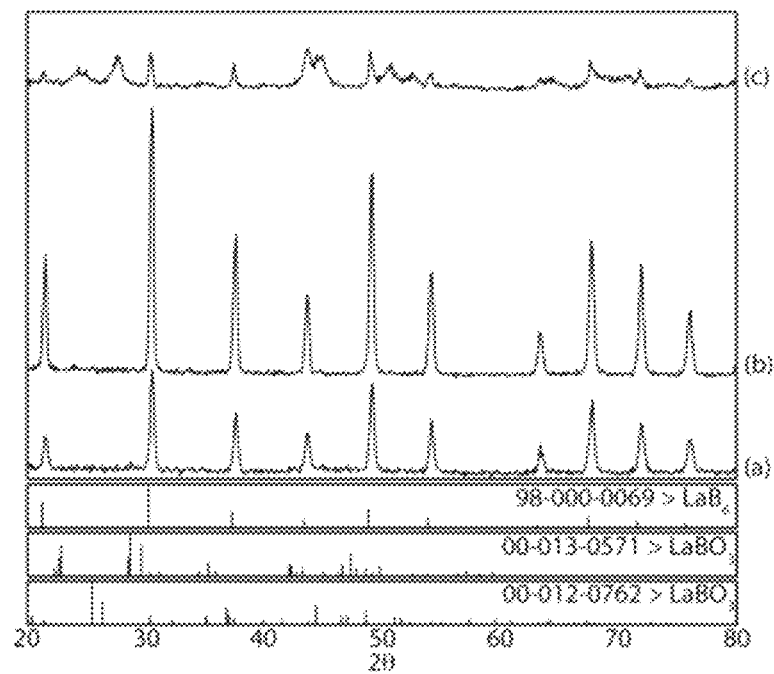
FIG. 18 illustrates x-ray diffraction patterns for materials prepared from lanthanum nitrate, carbohydrazide, and B1 boron in Procedure 4 at a fuel-to-oxidizer (F/O) ratio of 0.1666 and washed with HCl for 5 minutes (a), $H_2SO_4$ for 6 hours (b), and HF for 24 hours (c).

Powders formed using Procedure 4 were treated with HCl (80% acid-20% DI water). The amount of acid used for 1 g of the starting powder was 80 mL of acid and 20 mL of de-ionized water. FIG. 18 shows the x-ray diffraction results of the cleaned powders with different acids. FIG. 18(a), representing powders cleaned with HCl only, shows a well defined $LaB_6$ peak (PDF#98-000-0069). As the starting powder had $LaBO_3$ peaks, HCl was effective in removing the borate phase.

However, noise was observed in the XRD pattern. To see if this noise could be removed, the HCl-cleaned powders were further washed with sulfuric acid, nitric acid, or hydrofluoric acid. Nitric acid dissolved the powders. FIG. 18(c) shows the x-ray diffraction pattern for powders treated with HF for 24 hours. The peaks are very broad and match mixed phases of $LaBO_3$ (PDF#012-0762, PDF#013-0571) and $LaB_6$ (PDF#98-000-0069). It appears that HF oxidized some $LaB_6$ to $LaBO_3$.

FIG. 18(b) shows the x-ray diffraction pattern for powders cleaned with $H_2SO_4$. The amount of acid used for 1 g of the starting powder was 80 mL of acid and 20 mL of de-ionized water. The pattern shows a very good $LaB_6$ peak (PDF#98-000-0069), with higher peak intensity than the starting, unwashed material. It appears that powders washed with both HCl and $H_2SO_4$ were more crystalline than the unwashed material.

Figure 19:
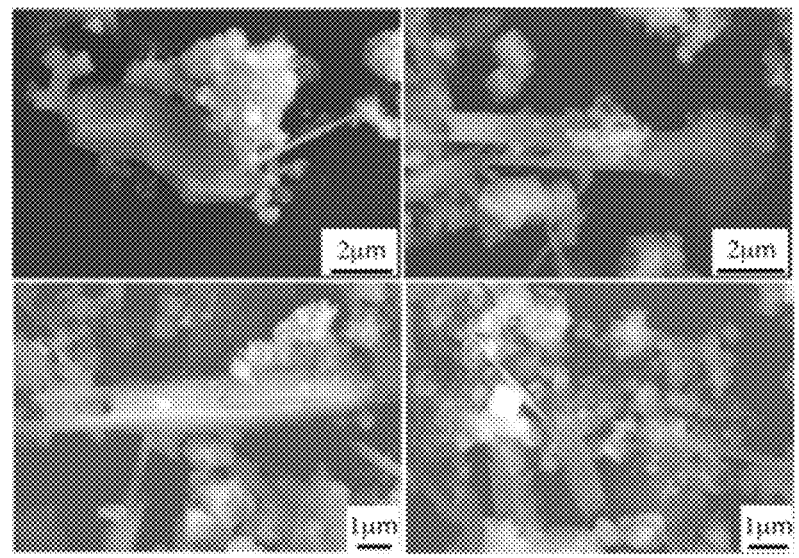
FIG. 19 presents SEM micrographs of $LaB_6$ washed with HCl for 5 minutes and high-energy ultrasonicated for 1 hour.

FIG. 19 shows SEM micrographs of powders ultrasonicated with a high-energy probe for 1 hour (3 sec on: 2 sec off pulse) at 70 watts of power. The powders' morphology is needle-shaped rods. Thus, the present disclosure provides a method of forming needle-shaped $LaB_6$, which may have unique applications compared with other $LaB_6$ morphologies.

$LaB_6$—B1 was determined to have a surface area of 2.0080 $m^2/g$, while $LaB_6$—B2 had a surface area of 0.9974 $m^2/g$. Thus, it appears that using B1 as boron source produces products having a higher surface area than those prepared using B2.

Example 2

Samarium Hexaboride Synthesis ($SmB_6$—B1)

Figure 20:
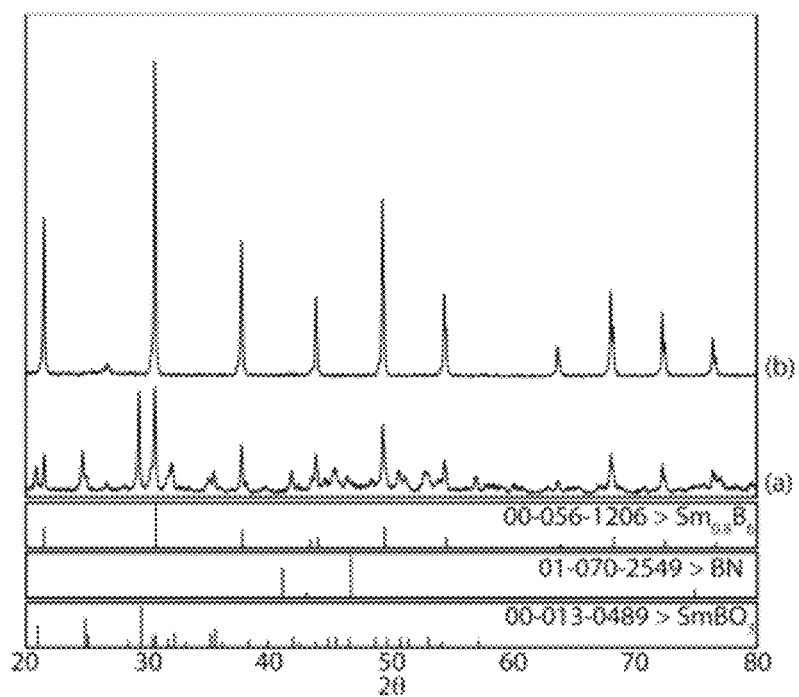
FIG. 20 illustrates x-ray diffraction patterns for samarium hexaboride ($SmB_6$—B1) powders before (a) and after (b) acid washing.

FIG. 20 presents x-ray diffraction data for samarium hexaboride powders synthesized with B1. FIG. 20(a) shows the diffraction pattern for the as-synthesized powders. The spectrum exhibits a peak (PDF#00-056-1206) corresponding to $Sm_{0.8}B_6$. The pattern also has peaks corresponding to $SmBO_3$ (PDF#00-013-0489). FIG. 20(b) shows the diffraction pattern for cleaned powders. The spectrum of the cleaned powders exhibits no significant impurities. The peaks corresponding to $SmBO_3$ (PDF#00-013-0489) between 25° and 30° show that a small amount of borate remains after washing.

Figure 21:
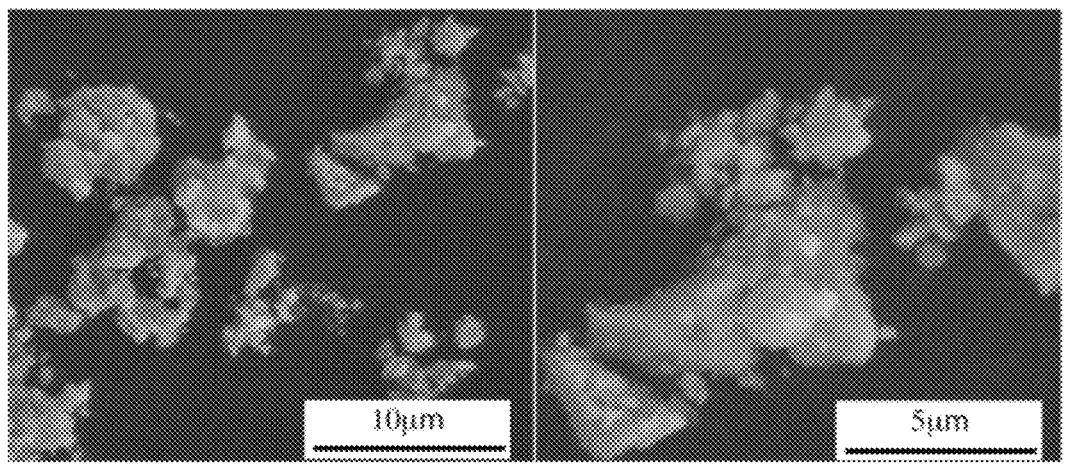
FIG. 21 presents SEM micrographs of samarium hexaboride ($SmB_6$—B1) before acid washing.
Figure 22:
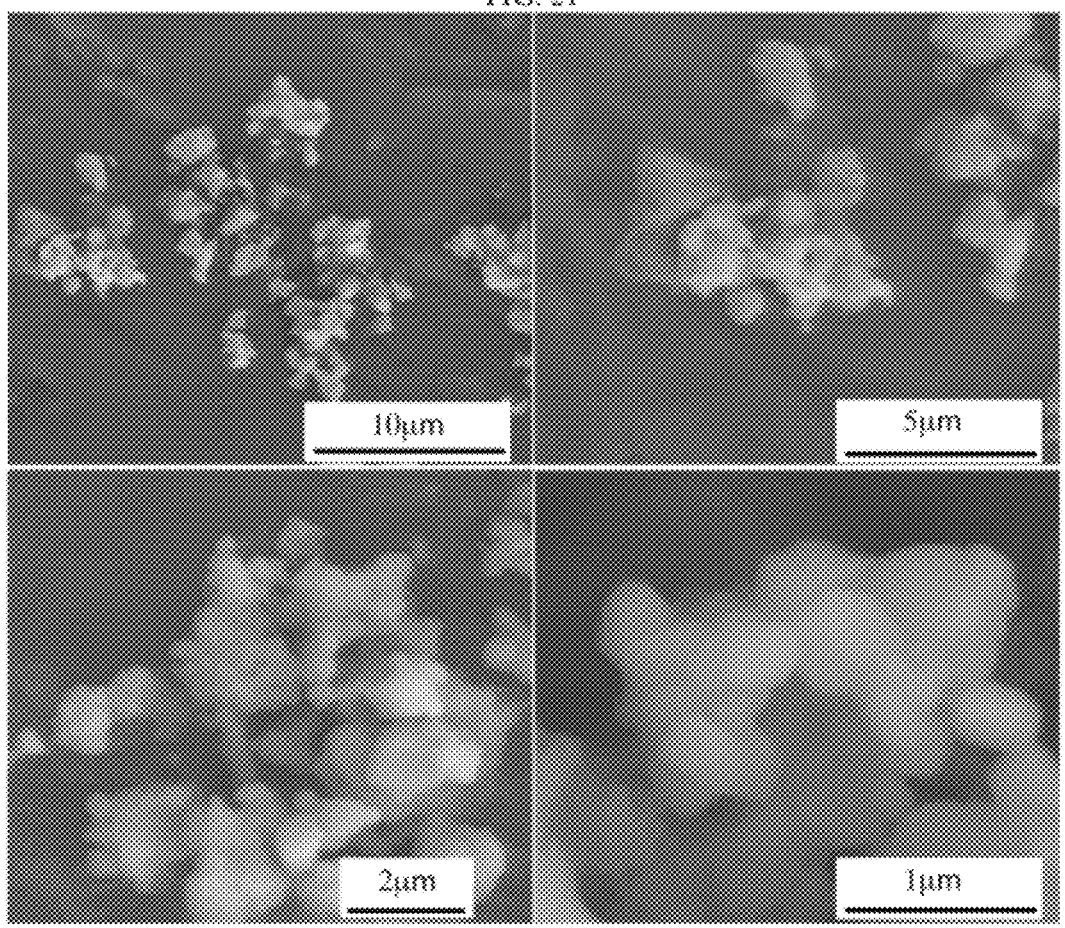
FIG. 22 presents SEM micrographs of samarium hexaboride ($SmB_6$—B1) after acid washing.

FIG. 21 shows SEM micrographs of the as-synthesized samarium hexaboride powders with B1. The micrographs exhibit large crystals, having an average particle size of ~5-10 μm. FIG. 22 presents SEM micrographs of washed $SmB_6$—B1 powder. The micrographs display single crystal cubes having an average particle size in the range of 500 nm-1 μm. The cubes are significantly less agglomerated after washing. The rounded edges of the cubes suggest that the sulfuric acid used for cleaning the powders is strong enough to etch the sides even after dilution. The powders are cleaned using the same procedure that was followed for cleaning $LaB_6$ powders (Example 1). Slight agglomeration is also observed from the micrographs, likely due to the action of sulfuric acid.

Samarium Hexaboride Synthesis ($SmB_6$—B2)

Figure 23:
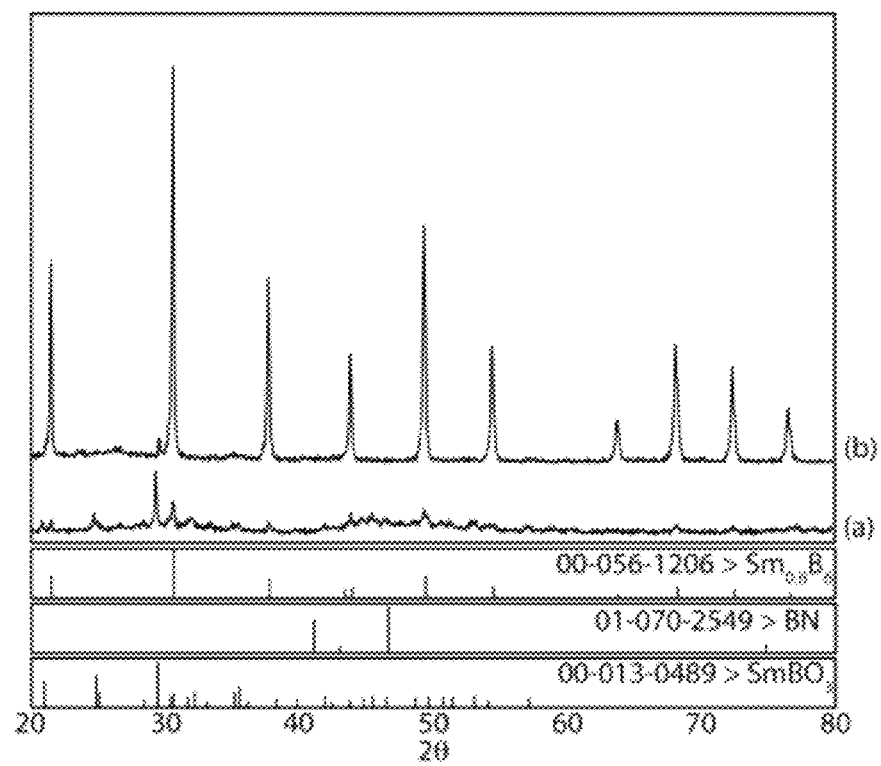
FIG. 23 illustrates x-ray diffraction patterns for samarium hexaboride ($SmB_6$—B2) before (a) and after (b) acid washing.

FIG. 23 shows the x-ray diffraction results of the samarium hexaboride powders that were synthesized with B2 as the boron source. FIG. 23(a) shows the diffraction pattern for the as-synthesized ($SmB_6$—B2) powders. The pattern includes peaks corresponding to $SmBO_3$ (PDF#00-013-0489). The pattern also has peaks corresponding to $Sm_{0.8}B_6$ (PDF#00-056-1206). $SmB_6$ appears to be formed in lower amounts than the borate phases. FIG. 23(b) shows the diffraction pattern for cleaned ($SmB_6$—B2) powders, confirming that impurities, such as $SmBO_3$, were removed by washing.

Figure 24:
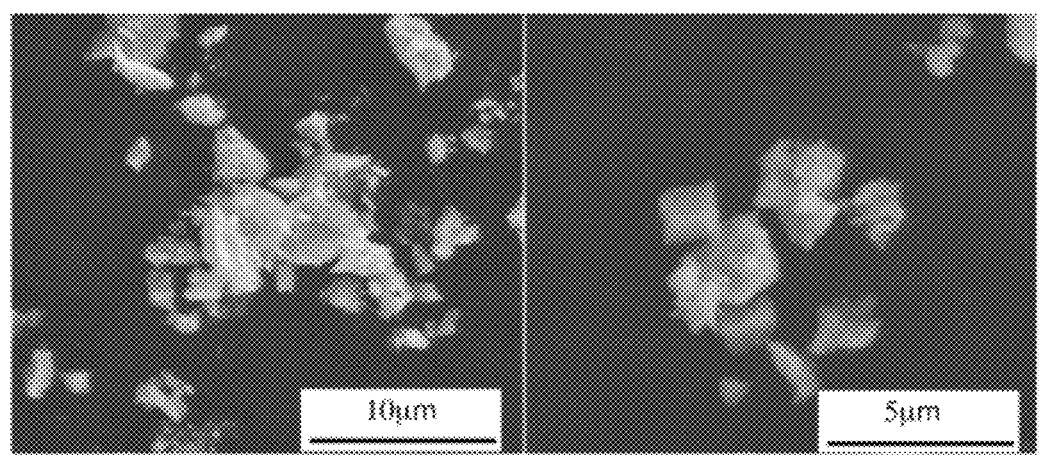
FIG. 24 presents SEM micrographs of samarium hexaboride ($SmB_6$—B2) before acid washing.
Figure 25:
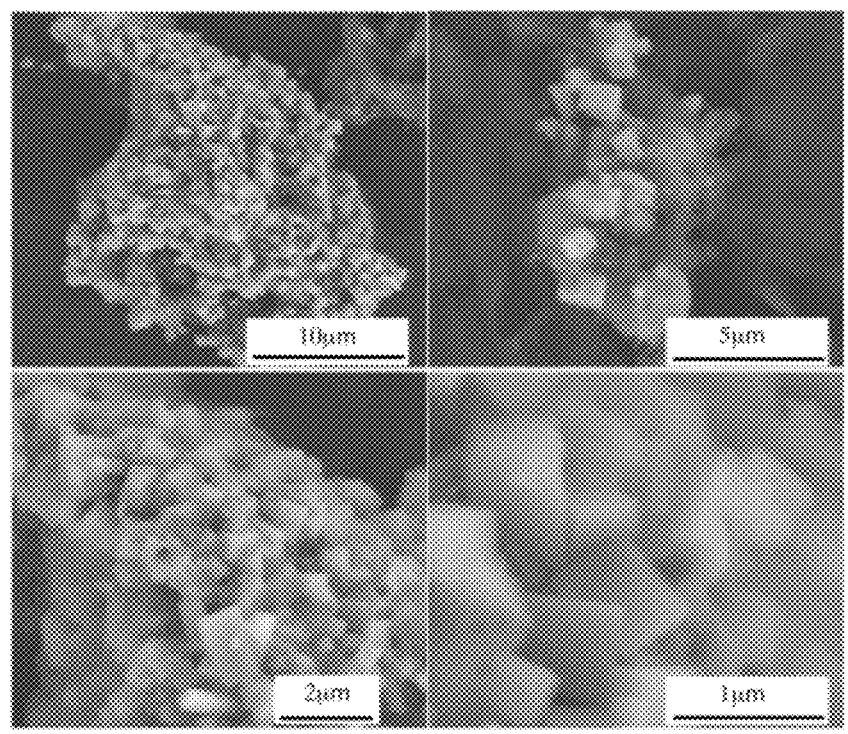
FIG. 25 presents SEM micrographs of samarium hexaboride ($SmB_6$—B2) after acid washing.

FIG. 24 presents SEM micrographs of as-synthesized samarium hexaboride powders using B2. The micrographs display large crystals, having an average particle size of ~1-5 μm. FIG. 25 presents SEM micrographs of washed $SmB_6$—B2 powders. The micrographs show single crystal cubes having average particles sizes in the range of 500 nm-1 μm. The cubes display agglomeration and rounded edges, likely due to the action of sulfuric acid. The powders were cleaned using the same procedure that was followed for cleaning $LaB_6$ powders (Example 1). The rounded edges of the cubes suggest that the sulfuric acid used for cleaning the powders etched the cube edges.

Surface area measurements resulted in 5.9879 $m^2/g$ for $SmB_6$—B1 and 1.5817 $m^2/g$ for $SmB_6$—B2. As with $LaB_6$, it appears that powders synthesized with B1 have a higher surface area than those synthesized with B2.

Example 3

Yttrium Hexaboride Synthesis ($YB_6$—B1)

Figure 26:
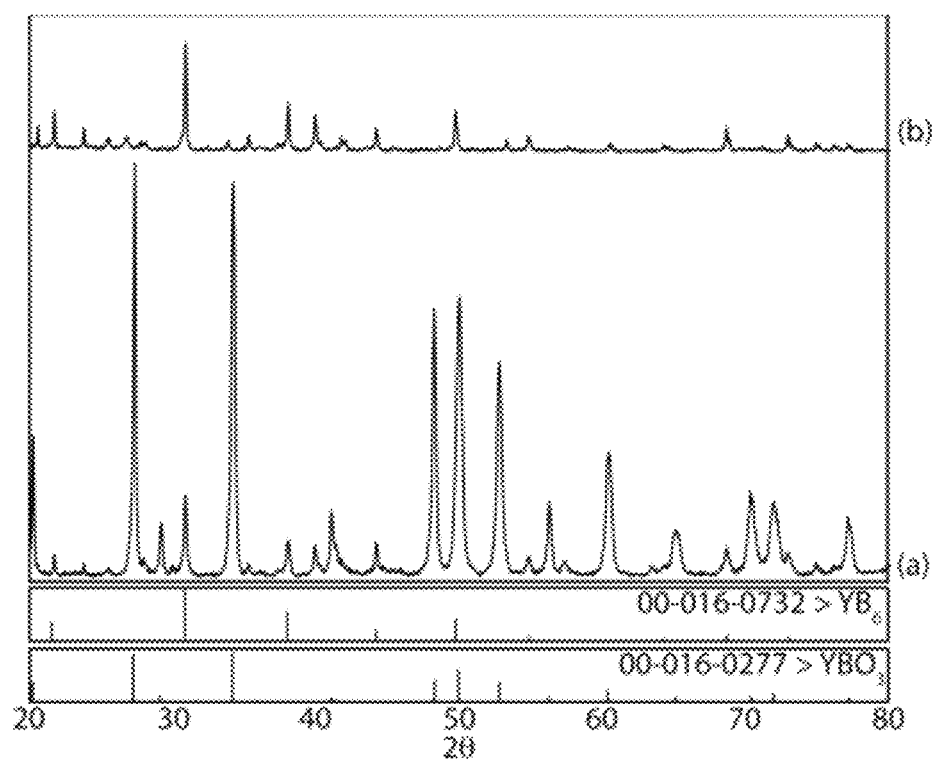
FIG. 26 illustrates x-ray diffraction patterns for yttrium hexaboride ($YB_6$—B1) before (a) and after (b) acid washing.

FIG. 26 shows the x-ray diffraction results of yttrium hexaboride powders synthesized with B1 at a F/O ratio of 0.1666. FIG. 26(a) shows the diffraction pattern for the as-synthesized powders. The pattern shows peaks corresponding to both $YBO_3$ (PDF#00-016-0277) and $YB_6$ (PDF#00-016-0732). FIG. 26(b) shows the diffraction pattern for the cleaned powders, which displays both borate and boride materials.

Figure 27:
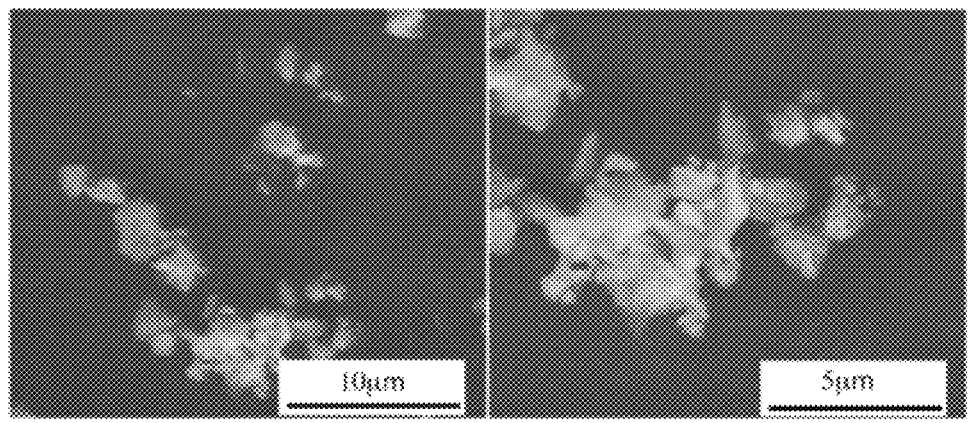
FIG. 27 presents SEM micrographs of yttrium hexaboride ($YB_6$—B1) before acid washing.
Figure 28:
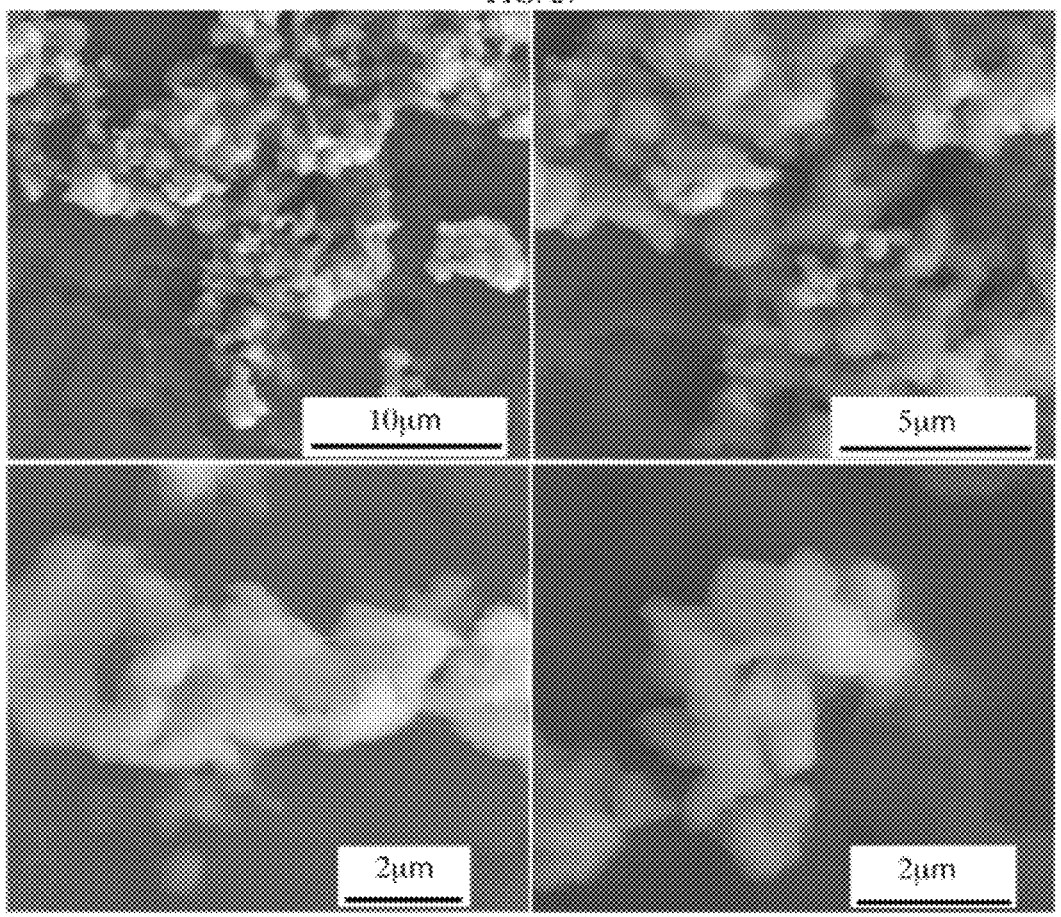
FIG. 28 presents SEM micrographs of yttrium hexaboride ($YB_6$—B1) after acid washing.

FIG. 27 shows SEM micrographs of the as-synthesized yttrium hexaboride powders with B1. The micrographs show large crystals, having an average particle size of ~1-5 μm. FIG. 28 shows the SEM micrographs of the washed powders of $YB_6$—B1. The washed particles appear as single crystal cubes having an average particles size in the range of 500 nm-1 μm. The cubes were significantly less agglomerated after washing.

The rounded edges of the cubes suggest that the sulfuric acid used for cleaning the powders, using the same procedure as for $LaB_6$ and $SmB_6$, etches the crystal edges. Slight agglomeration was also observed from the micrographs, which may be due to seeded crystal growth in the presence of sulfuric acid. $YB_6$ was not observed when B2 was used as the boron source.

It is to be understood that the above discussion provides a detailed description of various embodiments. The above descriptions will enable those of ordinary skill in the art to make and use the disclosed embodiments, and to make departures from the particular examples described above to provide embodiments of the methods and apparatuses constructed in accordance with the present disclosure. The embodiments are illustrative, and not intended to limit the scope of the present disclosure. The scope of the present disclosure is rather to be determined by the scope of the claims as issued and equivalents thereto.

We claim:

1. A method of making a metal boride, comprising:
heating a reactant mixture comprising a metal source that includes an oxidizer, a boron source, and a fuel at a temperature between about 200° C. and about 700° C. to initiate a combustion reaction, wherein the metal source is a metal salt and the oxidizer is part of the salt of the same metal source and the combustion reaction produces the metal boride defined by boron from the boron source and metal from the metal source.

2. The method of claim 1, wherein the fuel source comprises a carbonaceous fuel source.

3. The method of claim 1, wherein the fuel source comprises carbohydrazide.

4. The method of claim 1, wherein the metal source is a metal nitrate.

5. The method of claim 1, wherein the metal salt comprises a rare earth metal.

6. The method of claim 1, wherein the metal salt comprises an alkaline earth metal.

7. The method of claim 1, wherein the metal salt comprises a metal selected from lanthanum, samarium, and yttrium.

8. The method of claim 1, wherein heating the reactants comprises heating the reactants at a temperature of about 500° C.

9. The method of claim 1, wherein heating the reactants comprises heating the reactants from a lower temperature to the temperature at which the combustion reaction is initiated.

10. The method of claim 1, wherein the metal source is a metal nitrate and the oxidizer is the nitrate of the same metal source.

11. The method of claim 1, further comprising washing the metal boride with an acid.

12. The method of claim 11, wherein the acid comprises hydrochloric acid.

13. The method of claim 12, further comprising washing the metal boride with sulfuric acid.

14. The method of claim 1, further comprising ultrasonicating the metal boride.

15. The method of claim 1, wherein the metal salt comprises thorium or zirconium.

16. The method of claim 1, wherein the metal salt comprises lanthanum.

17. The method of claim 1, wherein the metal salt comprises samarium.

18. The method of claim 1, wherein the salt of the metal is selected from the group consisting of perchlorate and nitrate.

19. The method of claim 1, wherein the boron source is boron.

* * * * *